(12) United States Patent
Gee et al.

(10) Patent No.: US 6,374,286 B1
(45) Date of Patent: Apr. 16, 2002

(54) REAL TIME PROCESSOR CAPABLE OF CONCURRENTLY RUNNING MULTIPLE INDEPENDENT JAVA MACHINES

(75) Inventors: John K. Gee, Mt. Vernon; David A. Greve; David S. Hardin, both of Cedar Rapids; Allen P. Mass, Lisbon; Michael H. Masters, Cedar Rapids; Nick M. Mykris, Cedar Rapids; Matthew M. Wilding, Cedar Rapids, all of IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/056,126

(22) Filed: Apr. 6, 1998

(51) Int. Cl.[7] .................................................. G06F 9/52
(52) U.S. Cl. .......................... 709/108; 709/1; 710/260; 713/502
(58) Field of Search ................................ 709/100–106, 709/107–108, 1; 710/260; 713/502

(56) References Cited

U.S. PATENT DOCUMENTS

| | | | | |
|---|---|---|---|---|
| 5,319,760 A | * | 6/1994 | Mason et al. ............... | 711/208 |
| 5,692,193 A | * | 11/1997 | Jagannathan et al. ....... | 709/106 |
| 5,745,703 A | * | 4/1998 | Cejtin et al. ................ | 709/238 |
| 5,892,966 A | * | 4/1999 | Petrick et al. .............. | 712/36 |
| 5,923,892 A | * | 7/1999 | Levy .......................... | 712/31 |
| 5,953,741 A | * | 9/1999 | Evoy et al. ................. | 711/132 |
| 6,094,644 A | * | 7/2000 | Hillson et al. .............. | 705/400 |

* cited by examiner

Primary Examiner—St. John Courtenay, III
Assistant Examiner—Van H. Nguyen
(74) Attorney, Agent, or Firm—Nathan O. Jensen; Kyle Eppele

(57) ABSTRACT

Multiple Java Virtual Machines (JVMs) operate on a single direct execution JAVA processor with each JVM operating in a separate time slice called a partition. Each JVM has its own data and control structures and is assigned a fixed area of memory. Each partition is also allotted a fixed period of time in which to operate, and, at the end of the allotted time, a context switch is forced to another JVM operating in the next partition. The context switch does not transfer control directly from one JVM to another JVM. Instead, at the end of a partition time period control is switched from the currently operating JVM to a "master JVM" during a time period called an "interstice." The master JVM handles system interrupts and housekeeping duties. At the end of the interstice time period, the master JVM starts a proxy thread associated with the next JVM to become operational. The proxy thread handles JVM-specific interrupts and checks the status of the associated JVM. If the JVM appears operational the proxy thread transfers control to the JVM thread. Time intervals such as partition times and interstice times are enforced by hardware timers and memory accesses are checked by address comparison circuitry to prevent a system failure due to a malfunction in either the master JVM or another JVM.

25 Claims, 21 Drawing Sheets

FIG. 19

REAL TIME PROCESSOR CAPABLE OF CONCURRENTLY RUNNING MULTIPLE INDEPENDENT JAVA MACHINES

FIELD OF THE INVENTION

The present invention relates generally to computer systems which operate in real-time. More particularly, the present invention relates to real-time processors which run JAVA™ programs (JAVA is a trademark of Sun Microsystems, Inc.) and, specifically, to real time processors which can concurrently run several independent JAVA processing machines.

BACKGROUND OF THE INVENTION

Electronic systems, such as, computerized devices or computer controlled apparatus, are employed in dramatic numbers to perform various operations in diverse applications. These electronic systems range in complexity from simple consumer products, such as, home appliances and children's toys to complex arrangements, such as, aircraft autopilot systems, chemical processing controls or safety devices for complicated applications. Many of these electronic systems rely on internal, or embedded, computers for at least a portion of their functionality.

Such embedded computer systems often carry out such operations as sensing, computation, display, and control in response to stimuli from internal and external sources. Certain sensing and control applications have demanding speed requirements which can be described as "real time" speed requirements. Real time speed requirements demand that the embedded computer system responded to events or stimuli within a strict, specified amount of time. For example, embedded computer systems are utilized in most modern automobiles to control tasks, such as, fuel injection, anti-lock braking, air bag deployment, engine ignition, anti-lock braking, air bag deployment, engine ignition and other operations.

The amount of time allowed for computer response is generally very small. For example, an embedded computer system must rapidly analyze deceleration data to accurately and appropriately deploy an air bag in an automobile. This ability to meet stringent timing requirements often requires that processing resources be available upon demand in a predictable amount of time. Consequently, real-time computer systems typically utilize specialized and complex software to meet real time speed requirements. Many prior art real-time systems have been programmed in relatively "low-level" languages, such as assembly language, so that the programmer can maintain the strict control over the system operation which is necessary to meet the strict time requirements.

A significant consideration in the performance and effectiveness of a real-time computer system is the programming language methodology that is used to create and maintain the software elements that ultimately determine the functionality of the embedded computer system. With present day hardware fabrication costs, the software development costs often far outweigh the hardware costs. Consequently, it would be advantageous to reduce software development and maintenance costs. One problem with programs written in low-level languages is that they are often costly to develop and difficult to maintain.

A wide range of programming methods and languages have historically been used to develop the software elements or programs. The programming methods have ranged from the previously-discussed low level machine specific assembly languages to high level languages which are not specific to a particular hardware element or platform. Generally, high level languages are more efficient in both the design and maintenance of software programs so that their use is particularly advantageous. A broadly emerging type of programming methodology which promises to offer even more favorable efficiencies in program development and maintenance is object oriented programming software design. Object oriented programming software design is based on the concept of extracting particular characteristics from some item of interest along with a set of operations that may be performed on that information and grouping those pieces together to form an object. There are several benefits that may be realized by the implementation of a computer system in an object oriented programming environment. For example, compiler output including both generated program code and symbolic object references may be directly received, stored and integrated into an existing runtime system without further coordination with the already resident program and object references in the system. This capability is of significant value when large programs are created in pieces by large teams of programmers. Currently available object oriented programming languages include ADA 95, C, C++ and JAVA™ languages.

The JAVA programming language was created and propagated by Sun Micro Systems, Inc. to meet the need for an object oriented, platform independent and network enabled programming environment. The JAVA language has been quickly embraced by the computer software community and has been demonstrated to be efficient and robust for a wide variety of general purpose computing applications while generally providing improved development productivity. The successful performance of the JAVA programming language has resulted in a great interest in the use of the JAVA programming language for a wide variety of computing applications, including real time, embedded computing applications.

A program written in the JAVA language is compiled from the JAVA source code into as a series of platform independent commands called "bytecodes." Generally, a JAVA host computer system utilizes a JAVA run time environment to interpret and execute the bytecodes. The JAVA run time environment is called a "JAVA virtual machine" (JVM) and it can either interpret the bytecodes directly or use a "just-in-time" compiler to convert the bytecodes to platform dependent codes which run directly on the host platform. The JVM allows a flexible run-time environment.

However, in real-time embedded processor applications, the JVM has some significant drawbacks including speed and difficulty in meeting the strict timing requirements normally found in such environments. Consequently, in such applications, another type of processor is often used in which the JAVA bytecodes generated by a JAVA compiler are executed directly on the platform. In this case, the JAVA bytecodes are the low level assembly language of the processor and the JAVA program could be said to be running on a "JAVA machine" rather than on a JVM. Such processors are called "direct execution" JAVA processors.

In the direct execution JAVA processor context, the term JAVA Virtual Machine refers to a logical address space for JAVA classes within which one or more threads can execute. Within such a logical address space, several JAVA applications can concurrently run. Each JAVA application may also create multiple class name spaces by creating one or more class loaders, but, in the absence of application-created class loaders, only one class name space is created by the default class loader in a JVM.

In accordance with normal JVM operation, the JVM assigns each application its own "runtime" instance of the class java.lang.Runtime. Therefore, each application has its own runtime system, which both isolates applications from each other and provides a security model. However, the java.lang.Runtime class does not necessarily encompass everything that could be separate for each separate application. If multiple applications each use some of the same classes, a single copy of the static data structures will be created. Without separate JVMs or another class loader, multiple copies of the same static data cannot be created.

Although there may be multiple applications running in a JVM, there are many circumstances when it would be desirable to have multiple JVMs running on a single processor. For example, in an avionics system, there are generally several subsystems which have differing priorities. The flight controller, or the autopilot, have the highest priority (called level 1 priority) whereas other systems, such as in-flight entertainment systems, have a much lower priority (called level 5 priority). The level 1 priority systems are critical and there must be guarantees that such systems are not interrupted or blocked by the lower priority systems. It is also critical that the highest priority systems receive adequate resources to operate properly. Consequently, it would be advantageous to have multiple JVMs running in such an avionics system so that resources in one JVM are completely isolated from resources in another JVM. As stated above, this isolation cannot be guaranteed in systems where several applications are running in a single JVM. The most important resource to isolate is memory. Also, with separate JVMs, if an application in one JVM attempts to use up all the resources, its effect can be contained. In addition, controls must be established so that a first JVM cannot deny service to a second JVM by locking an object that the first JVM also needs to lock.

Another motivation for multiple JVMs on a single processor is to allow different policies for different applications. For example, the range of priorities in one JVM may be higher than for another JVM. Garbage collection strategies might differ, including even the existence of a garbage collector. Different limitations might also apply to different JVMs such as the amount of memory and number of threads.

A final motivation for multiple JVMs on a single processor is to support a partitioning of the application that can later be easily reconfigured to operate on multiple physical chips with separate memory.

SUMMARY OF THE INVENTION

The foregoing problems are solved in one illustrative embodiment of the present invention in which multiple JVMs operate on a single direct execution JAVA processor with each JVM operating in a separate time slice called a partition. Each JVM has its own data and control structures and is assigned a fixed area of memory. Each partition is also allotted a fixed period of time in which to operate, and, at the end of the allotted time, a context switch is forced to another JVM operating in the next partition.

In accordance with one embodiment, the context switch does not transfer control directly from one JVM to another JVM. Instead, at the end of a partition time period control is switched from the currently operating JVM to a "master JVM" during a time period called an "interstice." The master JVM handles system interrupts and housekeeping duties. At the end of the interstice time period, the master JVM starts a proxy thread associated with the next JVM to become operational. The proxy thread handles JVM-specific interrupts and checks the status of the associated JVM. If the JVM appears operational the proxy thread transfers control to the JVM thread.

In accordance with another embodiment, time intervals such as partition times and interstice times are enforced by hardware timers to prevent a system failure due to a malfunction in either the master JVM or another JVM.

In accordance with still another embodiment, all JVM data structures are referenced by a root JVM address. Thus, the same software can be used to process each JVM by simply changing the root address.

In accordance with yet another embodiment, the memory spaces which are allotted to each JVM are kept separate by hardware address comparison circuitry which checks the address for each read, write or code fetch operation against an address range which specifies the memory location allotted to a JVM. If the address falls outside the allotted range, the operation is not allowed to complete.

BRIEF DESCRIPTION OF THE DRAWING

FIG. 19 illustrates an array of chord masks used during a piano roll sequence.

DETAILED DESCRIPTION OF THE PREFERRED EMBODIMENT

Figure 1:
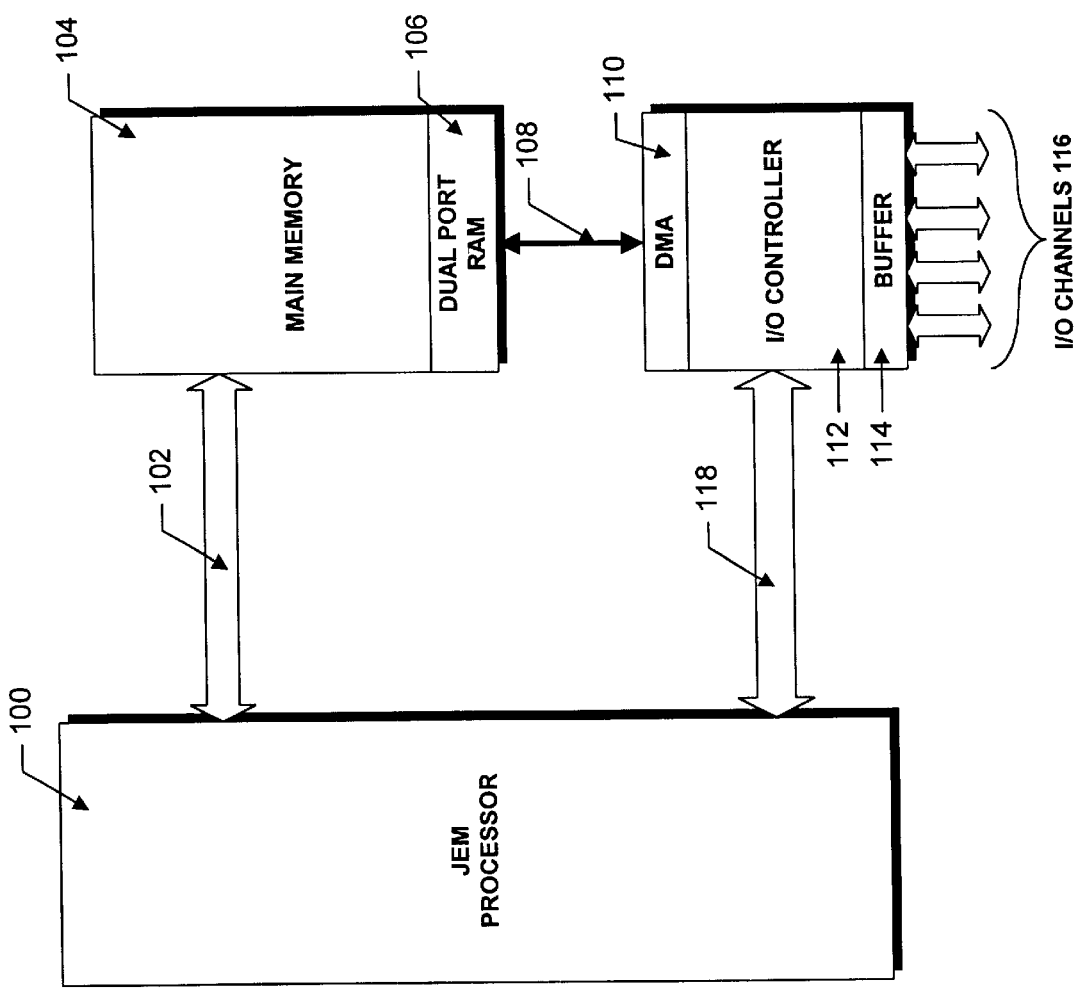
FIG. 1 is a block schematic diagram showing the inventive processor system including a microprocessor, memory and I/O controller.

As previously mentioned, a JAVA host computer system utilizes a so-called "virtual machine" when a compiled JAVA program is executed on a host platform which has a native programming environment that is unrelated to JAVA. The execution of the JAVA program may be by either interpreting the bytecodes, or by using a Just-In-Time (JIT) compiler to generate machine language instructions which may be executed directly by the host platform.

In particular, a JAVA application program, such as the following "hello world" program:

```
class hello {
    public static void main (String argv []) {
        System.out.println ("Hello!");
    }
}
``` must first be statically compiled by a JAVA compiler, which turns the JAVA code into bytecodes and puts the bytecodes into a "hello.class" file. This class file can then be interpreted on any machine which has a JVM running on it.

The JVM processes each of the bytecodes in the hello-.class file and executes them in a manner similar to the interpretation performed by other interpreted languages, such as Basic, LISP, and Smalltalk. When a JIT compiler is present, after reading in the hello.class file for interpretation, the JVM forwards the hello.class file to the JIT compiler. The JIT compiler then takes the bytecodes and compiles them into native code for the host machine. The compiler is "just in time" because it compiles code for methods on a method by method basis just before they are called. The JIT compiler is used because compiling the bytecodes and running the resulting executable code may be faster than interpreting the bytecodes. For example, if the application program calls the same method more than once, the method code does not have to be recompiled—the processor can simply re-execute the already-compiled native code. The JIT compiler is an integral part of the JVM, so it is transparent to the user.

The JVM is an abstract computing machine, but, like a real computing machine, it has an instruction set and uses various memory areas. The JVM does not actually execute the JAVA programming language. Instead, it operates on a particular file format called a "class" file. A class file contains JVM instructions (or bytecodes) and a symbol table, as well as other ancillary information. For the sake of security, the JVM imposes strong format and structural constraints on the code in a class file. However, any language with functionality that can be expressed in terms of a valid class file can be executed by the JVM.

Each class file must have a method called "main". A JVM starts execution by invoking the method "main" of some specified class and passing it a single argument, which is an array of strings. This invocation causes the specified class to be loaded, linked to other types that it uses, and initialized. The initial attempt to execute the method "main" of a class may result in the discovery that the class is not loaded—that is, the JVM does not currently contain a binary representation for the class. The JVM then uses a "classloader" object to attempt to find such a binary representation. If this process fails, an error is thrown.

After the class to be executed is loaded, it must be initialized before the method main can be invoked. Initialization involves the step of linking, and linking, in turn, involves the steps of verification, preparation, and (optionally) resolution. The verification step checks that the loaded class representation is "well formed", with a proper symbol table. The verification step also determines whether the code that implements the class obeys the semantic requirements of the JVM. If a problem is detected during verification, an error is thrown. Preparation involves allocation of static storage and the creation of any data structures, such as method tables, that are used internally by the JVM. If a problem is detected during preparation, an error is also thrown.

The resolution step includes the process of checking symbolic references from the class being executed to other classes and interfaces. If the referenced classes are not in the JVM, they are loaded and checked to make sure that the references in these other classes are correct. The resolution step is optional at the time of initial linkage. For example, a class implementation may resolve all symbolic references from the referenced classes and interfaces immediately at linking (This resolution may result in errors from further loading and linking steps.) This implementation choice operates in a manner similar to the static linking operation that has been done for many years in programs written in compiled languages, such as the C language.

Alternatively, a class implementation may resolve symbolic references only when they are actually used. Consistent use of this strategy for all symbolic references would represent a "lazy" resolution. In this case, if the class being executed had several symbolic references to another class, the references might be resolved one at a time as they were used. The references might not be resolved at all, if they were never used during execution of the program.

Like the JAVA language, the JVM operates on two data types: primitive data and reference data. These data types can be stored in variables, passed as arguments, returned by methods, and operated upon. The JVM expects that nearly all type checking will be done at compile time and therefore does not perform type checking itself. In particular, data need not be tagged or otherwise be inspectable to determine its type. Instead, each instruction used by the JVM is designed to work with a particular data type which can be determined from the instruction name. For example, the JVM instructions, iadd, ladd, fadd, and dadd all add together two numeric values, but they operate with operands whose types are int, long, float, and double, respectively.

The JVM also supports objects, which are either dynamically allocated class instances or arrays. A reference to an object is considered to have the JVM type "reference" which is similar to a "pointer" to the object. More than one reference may exist to an object. Although the JVM performs operations on objects, it always operates on, passes, and tests objects via values of type "reference".

The JVM is actually composed of one or more threads. Each JVM thread has a private JAVA stack, created at the same time as the thread, which stores JVM frames. A JAVA stack is the equivalent of he stack of a conventional programming language such as C. The JAVA stack holds local variables and partial results, and plays a part in method invocation and return. The JVM specification permits JAVA stacks to be of either a fixed or a dynamically varying size. The JVM also has a method area that is shared among all threads.

The method area is analogous to a "storage area" for compiled code used by a conventional language, or to the "text" segment of a UNIX process. It stores data structures which are created for each class, such as a "constant pool", field and method data, and the code for constructors and methods, including special methods that are used in class and instance initialization and interface type initialization. The method area is created when the JVM starts. The method area may be compacted by garbage collection or may not be compacted. Further, the method area may be of a fixed size, or may be expanded as required by the computation and may be contracted if a larger method area becomes unnecessary.

The aforementioned constant pool is a per-class or per-interface runtime representation of a constant_pool table always found in a JAVA class file. The constant pool contains several kinds of constants, ranging from numeric literals known at compile time to method and field references that must be resolved at run time. The constant pool serves a function similar to that of a symbol table for a conventional programming language, although it contains more data than is found in a typical symbol table. The constant pool for a class or interface is created when the JAVA class file for the class or interface is successfully loaded as previously described.

Sun Microsystems, Inc., has published a complete description of the JVM and its operation in a book entitled "The JAVA Virtual Machine Specification" (ISBN 0-201-63452-X) which is incorporated in its entirety herein.

For Internet related applications, the JVM interpreter and JIT compiler methodologies described above are of great interest since there are a significant number of personal computers in existence that are candidate platforms for JAVA capability. The only requirement for JAVA operability on a given platform is the presence of a JVM interpreter for that platform that correctly implements the runtime environment. The JVM is attractive because the creation of the JVM runtime environment is a task that need be completed only once for each type of platform, enabling a JAVA application developer to concentrate solely on application development instead of platform specific issues.

However, as previously mentioned, in a real-time embedded processor applications, the JVM has some significant drawbacks. Consequently, in such applications, another type of processor is often used in which the JAVA bytecodes generated by a JAVA compiler are executed directly on the platform. In this case, the JAVA bytecodes are the low level assembly language of the processor and the JAVA program could be said to be running on a "JAVA machine" rather than on a JVM. Such processors are called "direct execution" JAVA processors. Such processors are not inherently as flexible as the JVM implementation in the area of platform independence. However, the least common denominator between all of these runtime environments is the JAVA language itself, which is the primary vehicle for interoperability.

Direct execution JAVA processors can be of many types. However, the JVM is has characteristics which make certain processor architectures more suitable for implementing a direct execution processor. In particular, the mechanism by which operands are addressed is of particular interest. Two common mechanisms are registered oriented addressing and stack oriented addressing.

In a register oriented architecture, operands are temporarily stored in hardware registers and the processor must generate an address to identify the particular register or memory location that contains the operand to be used for the processor operation. A stack oriented architecture uses a Last-In, First-Out (LIFO) storage "stack" to contain operands for processing. This structure is often termed a "zero-address" mechanism, since no explicit address is used to either place information on the stack or to remove information from the stack. Operands are processed based solely their order in the stack.

Each of the described addressing mechanisms has advantages and disadvantages. The primary advantages of register oriented addressing are speed and ease of implementation. Since processor registers are typically implemented as an integral element of the processor core logic, access to the registers may be accomplished at very high speed. Multiple registers may be implemented with multiple data busses to allow a high degree of parallel access. The primary disadvantage of the register oriented architecture is the fact that there is a degree of complexity associated with the addressing of the registers for proper program execution. This complexity becomes particularly evident when high level languages are used that depend on machine generated code such as a compiler would generate. Since the register addressing mechanisms are typically limited, the burden of address resolution and management falls on the compiler. In many cases, an additional level of logic design is required to implement this function.

The benefit of the stack oriented architecture is most evident when a compiler generated high level language is used. The compiler needs only to correctly order the sequence of operations as operands are placed on the stack and used later for processing. This sequence of events is well suited to the respective nature of compiler generated code and results in an inherent efficiency of both memory size and execution speed. The historical disadvantage of the stack architecture is that the stack is typically implemented in external RAM and therefore generally requires a number of relatively slow sequential memory accesses to perform the processor operations.

Since the JVM uses stack based processing, a processor which also uses stack-based processing is a suitable candidate for a direct execution processor. An example of a stack oriented processor architecture that has seen broad product use since the early 1980's is the Rockwell Advanced Architecture Microprocessor (AAMP) family. The AAMP processor family has both 16-bit and 32-bit members and uses microcoded instruction set definitions to implement its instruction formats and data types. With suitable microprogramming and instruction set, the AAMP processor can be advantageously used as the inventive JAVA embedded microprocessor (JEM).

The inventive JEM is a microprogrammed machine wherein program control is carried out via a stored program (in ROM) rather than discrete sequential logic. This structure is illustrated in FIG. 1. The JEM processor 100 communicates with the ROM code memory 104 as illustrated by arrow 102. A small dual port RAM 106 may also be provided which is controlled by the direct memory access unit 100 as indicated by arrow 108. The processor 100 can also receive input and output signals via an I/O controller 112 as indicated by arrow 118. The I/O signals are communicated to the processor via I/O channels 116 which connect to I/O controller 112 by means of buffer 114.

Figure 2:
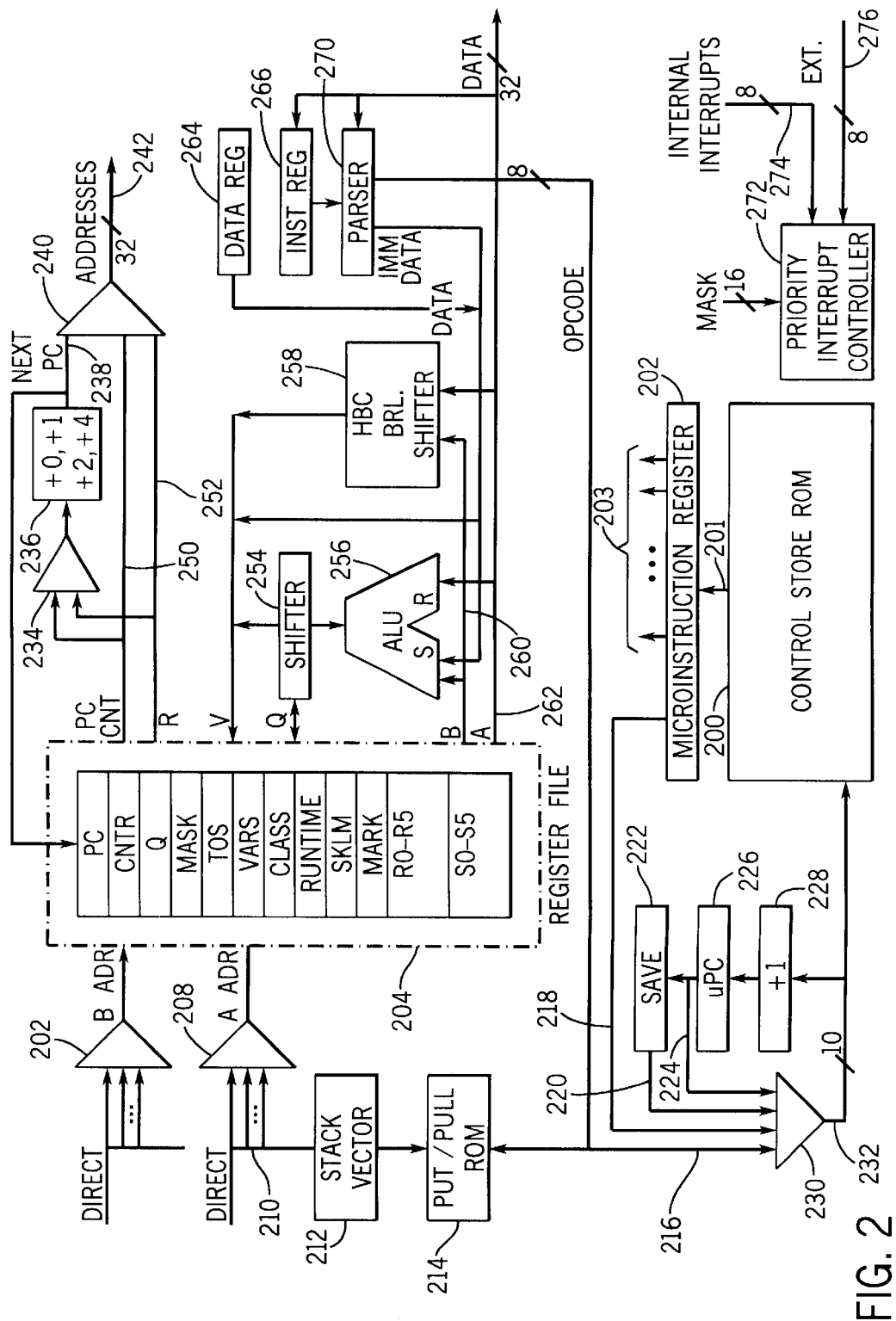
FIG. 2 is a more detailed block schematic diagram illustrating the internal hardware construction of the microprocessor.

The internal construction of the JEM processor is illustrated in FIG. 2. There are two levels of stored programs in the JEM system: one stored program is at the "micro" level using microinstructions in a control-store ROM 200, and the other stored program is at the "macro" level using bytecodes stored in a ROM code memory 104. The prefix "micro" will be used before elements which are involved with the microcoded portion of the processor to distinguish the processing of the "macro" bytecodes. In essence, each bytecode is interpreted as a pointer to a sequence of microinstructions which will actually be executed in place of the bytecode. Each microinstruction causes one or more elemental operations to occur in the machine, such as enabling a register to be loaded or selecting an ALU function to perform.

Instruction bytecodes are fetched from code memory 104 four at a time over 32-bit data bus 216 and stored in the instruction register 266. Execution begins with the translation of the "opcode" portion of the bytecode into a starting microprogram address. A microsequencer comprised of microinstruction register 202, selector 230, incrementer 228, microprogram register 226 and microinstruction register 222 then steps through locations in control-store 200 to cause proper execution of the instruction.

The control store 200 is implemented with a 2K×54 ROM with an optional expansion RAM (not shown.) Control store 200 contains microinstruction sequences for each of the JAVA bytecodes and for "internal" management processes, such as stack cache adjustment, initialization, interrupt servicing, and task management. The output 201 of the control store 200 is loaded into the microinstruction register 202 at the beginning of each microcycle. The microinstruction in register 202 can then be processed while the next microinstruction is being fetched. As a result of this "pipelining", microinstruction fetch and execution are overlapped. The register's outputs 203 configure the data paths and determine which operations are to occur during the current microcycle. If an interrupt is pending in interrupt controller 272, the microcontroller automatically vectors to a service microinstruction routine determined by the interrupt controller before executing the next instruction.

The control-store 200 receives a 12-bit microaddress 232 from the selector 230. At each microprogram step, the next microaddress is selected from selector 230 as the microsequencer output 232 from one of the following sources:

1. the output 224 of the microprogram counter 226 containing the address of the current microinstruction incremented by 1 (by incrementer 228), providing for sequential execution,
2. a 12-bit jump address 218 emanating from a field of the current microinstruction in register 202, providing for non-sequential access to the control store 200,
3. a save register 222 previously loaded with the contents of the microprogram counter 226 to establish a return linkage from a called microsubroutine.
4. the current opcode byte from the instruction register 266 (on bus 216), joined with three fixed bits depending on the type of mapping desired, providing for dispatching to an initial microprogram address, or
5. fixed vectors (not shown) that provide a starting microaddress for initialization, interrupt servicing, and stack cache adjustment (described below.)

The selector 230, and, accordingly, the selection of the next microinstruction to be executed, is generally controlled by a four-bit field of the current microinstruction. In some cases the selection by the sequencer is conditional on the state of a selected status line (not shown) that can be directly controlled by a test multiplexer (not shown) which allows for on-board testing. Conditional and unconditional jump and map operations can be initiated, along with unconditional call, return, and continue options.

A special acceleration feature of the JEM processor is the use of six stack registers (S0–S5) in on-board register file 204. Together, these registers function as a "cache" memory and act as an extension of the accumulator stack which would normally be located in external data memory 106. Registers S0–S5 each store one operand and minimize accesses to data memory 106 for accumulator stack operations. Experience has shown that, in about 95% of processing operations, the contents of the stack cache will include the operands necessary for immediate instruction execution. Thus, adjustments are rarely needed, and the throughout enhancement obtained greatly outweighs the overhead of cache maintenance.

The number and location of valid operands resident in the registers S0–S5 is maintained by a stack vector register 212. A microinstruction sequence used to execute a particular JAVA bytecode assumes that the correct number of valid operands have been loaded into the registers S0–S5. For example, a microinstruction sequence which executes the "DUP" JAVA bytecode assumes that at least one valid operand is present in the registers S0–S5 but not more than five operands are present. As part of each microinstruction sequence, the microcontroller checks to determine if a "register stack" adjustment is needed by applying the opcode portion of the JAVA bytecode on bus 216 and the stack vector state in register 212 as an address to put/pull ROM 214. The output of ROM 214 indicates if execution can continue or if an adjustment to the cache is necessary.

If an adjustment is required, the microcontroller automatically enters one of two microinstruction sequences (as determined by ROM 214 output) that either access memory 104 to obtain an additional operand or to remove an excess operand from the cache by a "op" operation. Upon completion of stack adjustment, mapping is re-initiated to begin bytecode execution.

An 16-input priority interrupt controller 272 is included. Interrupt inputs are captured in a storage register (not shown) and a mask (MASK) from the register file 204 determines which interrupts will be recognized. A priority encoder (not shown) generates the identifying number of the highest-priority unmasked interrupt. Clear decoding logic (not shown) is employed to reset a capture flip-flop (not shown) corresponding to the interrupt being serviced.

A 32-bit data path provide the data manipulation and processing functions required to efficiently execute the JEM instruction set. Included in this data path are the data and address interface 262 and 242, address incrementers 236, instruction register 266, parsing logic 270, the arithmetic-logic unit (ALU) 256, shifters 254, and a multiport register file 204.

The register file 204 is a key element of the processor architecture. It has a multiport design which is important in achieving the parallelism needed for high execution speed and compact microcode. The A and B address inputs, 208 and 202, provide arbitrary selection of two source operands output on output A and output B, 262 and 260, respectively. The register location addressed by the B address input 202 is also a potential write destination. Separate ports are used for shifting a Q register (Q), providing a mask to the interrupt controller (MASK), and for external address generation. The outputs 250 and 252 of both the program counter register location PC and the counter register location CNTR are provided to a multiplexer 234 which generates an output to address incrementers 236. The incremented address 238 can be restored in register locations PC and CNTR and provided, via selector 240 on address bus 242 to the external memory 104 for accessing sequential information.

The output F of the ALU 256 is provided to a shifter element 254 and may be shifted a single-position to the left or right or multiple bits to the left and right. Eight shift linkages are provided to allow efficient implementation of integer and floating point multiplication and division, and error detection code computation. In addition to the single-bit shifter, a barrel shifter is provided. The barrel shifter allows for quick exponent extraction and normalization of floating point numbers and fast shift instructions. A hidden-bit counter is provided to determine the leading zeros in a floating point number.

The 32-bit ALU 256 provides addition, subtraction, shifting, priority encoding, logical operations, and indications of sign, all-zero, carry, overflow and detection of floating point Emax and Emin. The R and S inputs to the ALU are fed from multiplexing logic in order to provide several source alternatives. Included are variations of the register-file outputs, 32-bit data read from memory, immediate byte, short word, and word fields from the instruction stream, and microconstants. Carry control is provided to perform 64-bit arithmetic.

A 32-bit instruction register 266 receives four bytes from bytecode memory 104 for each fetch initiated. The incoming bytes are either opcodes, immediate data, or a combination of each. The parser element 270 separates the opcodes and data. Opcode bytes are passed to the microcontroller, via bus 216, to initiate microinstruction execution as discussed above. Immediate data bytes are sent to the ALU 256 as S-source operands. In this latter case, the parsing logic 270 also formats the immediate data to avoid shifting or masking through the ALU 256.

Because most instructions are one byte in length, the 32-bit instruction register 266 provides partial look-ahead. When the microcontroller is ready to start a new microinstruction sequence to execute another bytecode, the opcode portion of the bytecode is either in memory 104 or already fetched and resident in the register 266. The determination of whether the opcode is already resident in the register 266 is based on the two least-significant bits of PC and conditional logic decides when it is necessary to perform a fetch.

When the processor writes to memory 104, the operand is selected as the register file's 32-bit A-output port 262. Data read from memory 104 is synchronized by the 32-bit data register 264 and passed to the ALU 256 as an S source and subsequently into the register file 204 via the V input.

Another important JEM architecture consideration for efficient processing of JAVA bytecodes is the instruction set architecture. Since computers typically execute sequences of instructions to perform required computation and control functions, the types and speed of instructions that are executed determine the functionality; and performance of the computer. Instruction set architectures may be implemented in a number of ways ranging from pure combinational logic to sequential state machines or some combination thereof. In the JEM processor, the JAVA bytecodes is implemented by a microcoded state machine structure using a fast state machine with a relatively wide microcoded instruction word format to perform low level operations.

Figure 3:
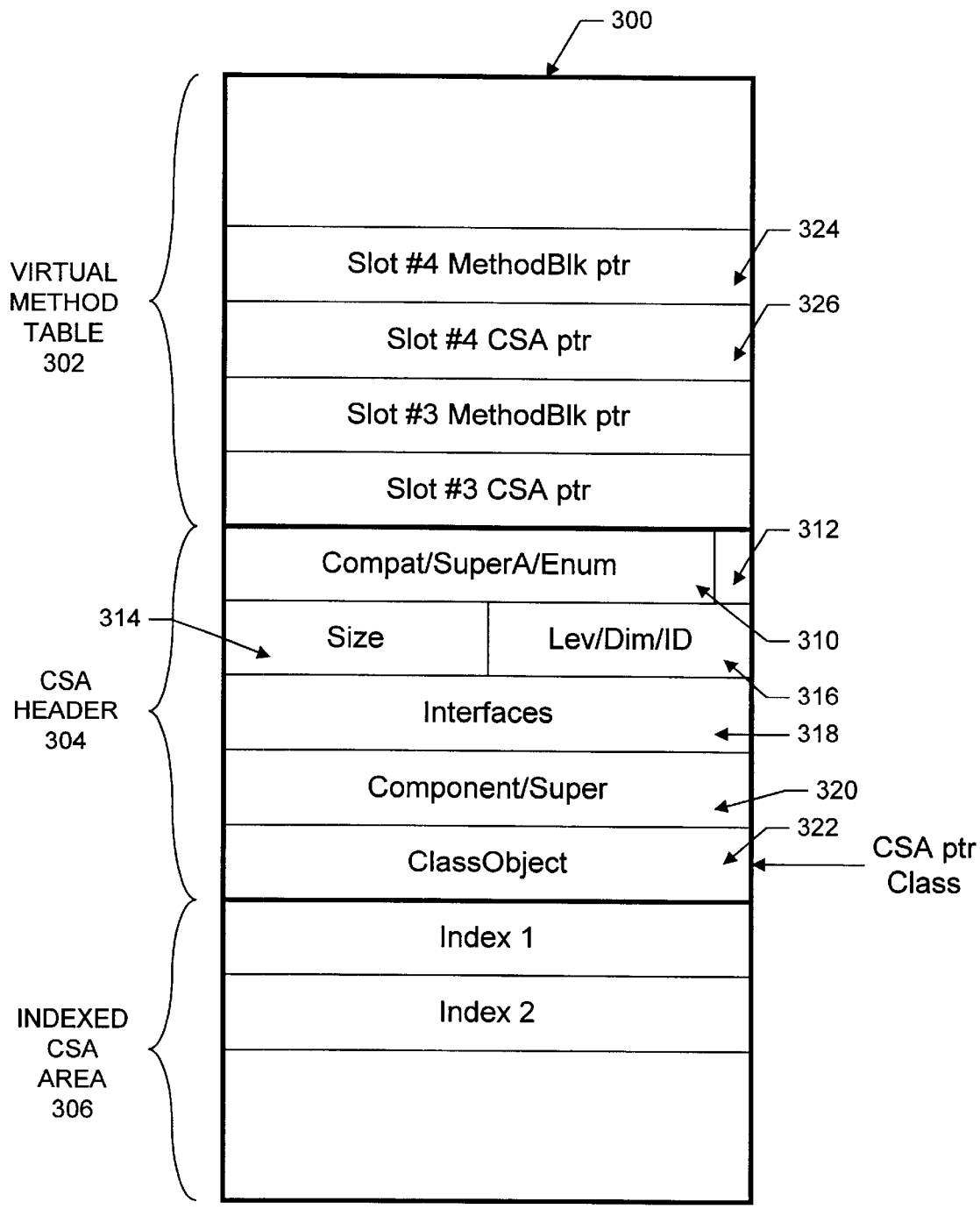
FIG. 3 is a schematic diagram of a class static area showing the contents thereof.

In addition to optimized processor and instruction set architecture, the JEM processor also uses data structures which are optimized for JAVA bytecode processing. In particular, "class" data structures are based on the class file structures defined by the JVM specification and discussed briefly above. The class data structures are optimized for efficient run-time operation and contain seven parts:
1. class static area (CSA) header
2. virtual method table
3. class indexed area
4. method blocks
5. class fields
6. superclass array
7. interface list The class static area, or CSA, forms the basis for a class definition and the organization of CSA data in memory is shown in FIG. 3. A CSA 300 contains a virtual method table 302, a CSA header 304, and a class indexed area 306. Entries in these three areas locate method blocks, class fields, an array indicating classes from which the class was extended (called a "superclass array"), and the interface list for the class. CSA 300 is a doubly-ended list structure in which each entry is comprised of a 32-bit word. The virtual method entries 302 are indexed at negative byte offsets from the CSA pointer 308 which indicates the location of the class and the class indexed area 306 is indexed at positive byte offsets from the CSA pointer 308. Each entry, or slot, in the virtual method table consumes two words.

The CSA header 304 is also located directly at, or at a negative byte offset from, the CSA pointer 308. The CSA header 304 consumes five words and overlaps the virtual method table 302. Therefore, virtual method table slot numbers 0 through 2 do not exist. Four types of CSA structures are used which differ in the contents of the CSA header 304:
1. ordinary class CSA which represents a class defined in class files;
2. interface class CSA which represents an interface defined in class files;
3. reference array CSA which is used to define singly- and multiply-dimensioned arrays of objects or interfaces; and
4. primitive array CSA which is used to define singly- and multiply-dimensioned arrays of primitive elements The CSA header 304 contains seven fields 310–322 which, in turn, can contain up to seven pieces of information. Some of the fields are overloaded and have different meanings according to the value of the Type field 312. The first field 310 contains information which identifies the CSA of a superclass for an ordinary class data structure, the CSA of the ultimate object of a reference array data structure or an enumeration value indicating the primitive data type for a primitive array CSA. This field is zeroed when the CSA is associated with an interface class. The superclass array identifies all superclasses of an ordinary class and contains an ordered list of superclass CSA pointers beginning with java/lang/Object at word index 0 and ending with the superclass of the present class. The superclass array pointer in the CSA for java/lang/Object is a null pointer.

The next field 314 identifies the size in 32-bit words of an instance of an object of the class when the CSA represents ordinary classes and contains a size code which is used by the processor microcode to quickly adjust the index or size of an array to a physical byte offset in the case of a primitive array CSA. This field is zeroed for interface classes and reference array classes.

The next field 316 contains a value which indicates the number of levels from java/lang/Object in a CSA which represents an ordinary class. For CSAs associated with interface classes, this field holds a unique interface ID. For CSAs associated with reference and primitive arrays, this field holds a value which indicates the number of dimensions of the array class.

The interfaces field 318 contains a pointer to a list of interfaces implemented by the associated class and interfaces implemented by all superclasses of this class (the interfaces list is discussed below.) The interfaces pointer is "null" if this class, and all of its superclasses, implement no interfaces. The next field 320 contains a value identifies the superclass array for a CSA associated with an ordinary class and contains a value identifies the CSA for a component of the reference and primitive array classes. This field is zeroed for a CSA which represents an interface class. The ClassObject field 322 holds a pointer to an object for this class identifying a lock control block for synchronized static methods of this class and other class information. The structure of this class object is defined by java/lang/Class definition. The CSA pointer in class objects points to the CSA for java/lang/Class.

The virtual method table 302 has entries that locate all the virtual methods that may be invoked on objects of the type contained in the class represented by the CSA structure 300. These methods include the virtual methods of the class and all superclasses. Each virtual method table entry, or slot, consists of a pair or 32-bit words including a MethodBlk pointer (such as pointer 324) and a CSA pointer (such as pointer 326.) The MethodBlk pointer 324 locates a method block containing the opcode stream for the method and some additional data items that define the use of the method. MethodBlk pointers are found in a number of constructs, including, but not limited to, virtual method tables, ClassMethodRefs, stack marks, initialization data, trap tables, and interrupt tables. In most cases, a MethodBlk pointer is accompanied by a class CSA pointer.

The CSA pointer 326 locates the CSA (this class or one of its superclasses) for the method and thus locates an indexed CSA area (described below) for the method opcodes to use. A slot number is used to select a particular virtual method table entry. These slot numbers are typically specified in InstanceMethodRef entries in a CSA indexed area.

The indexed CSA area 306 contains references to data used by opcodes in methods of the class represented by the CSA. Each entry in the indexed CSA area 306 consumes either 32 or 64 bits; one word or two words, respectively. All entries are word aligned and the indices specify a word offset from the CSA pointer location. Indices of zero are not allowed, since the zeroth element of the indexed CSA area is not available. In the case of double word entries the index identifies the lowest addressed word of the two. The types of entries in the indexed CSA area include:

1. ClassRefs which identify a class by pointing to the CSA for that class. A ClassRef with a CSA pointer of "null" indicates that the ClassRef has not been resolved. In this case, as described below the processor opcodes will trap to software to resolve the class reference and replace the null CSA ptr.
2. InstanceFieldRefs which provide byte offsets into objects for their fields. This field consists of a FieldOffset value, which, along with an objectref pointer, identifies the location in memory of the field. Due to the object header, FieldOffsets of zero through seven do not identify legal fields. So, a FieldOffset value of zero is used to determine that this InstanceFieldRef has not been resolved. In this case, the JEM opcodes will trap to software to resolve the field reference and replace the zero FieldOffset.
3. InstanceBitFieldRefs provide byte offsets into objects and contain a FieldOffset value and Size and Start bit fields. The FieldOffset field, along with the objectref pointer, identifies a location in memory of the field. The Start and Size fields identify which bits of that memory location to access. Due to the object header, FieldOffsets of zero through seven do not identify legal fields. So, a FieldOffset value of zero is used to determine that this InstanceBitFieldRef has not been resolved. In this case, the JEM opcodes will trap to software to resolve the field reference and replace the zero FieldOffset.
4. ClassFieldRefs provide addresses for class fields and consist of a FieldAddress field containing the actual physical byte address of the field in memory. Since no class field may reside at physical byte address zero, a null FieldAddress is used to signify that this ClassFieldRef has not been resolved. In this case, the JEM opcodes will trap to software to resolve the field address and replace the null FieldAddress.
5. ClassBitFieldRefs contain a FieldAddress field and bit fields Start and Size. The FieldAddress is the actual physical byte address of the field in memory. The Start and Size fields identify which bits of that memory location to access. Since no class field may reside at physical byte address zero, a null FieldAddress is used to signify that this ClassBitFieldRef has not been resolved. In this case, the JEM opcodes will trap to software to resolve the field address and replace the null FieldAddress.
6. InstanceMethodRefs provide a locator for the virtual methods of an object. The reference value includes a Slot# which identifies the entry in the object's CSA virtual method table. This entry has a MethodBlk pointer and CSA pointer for the method to be invoked. A second portion of the InstanceMethodRefs value identifies the number of 32-bit words, including the objectref, that are to be passed to the virtual method. Since virtual method table slot zero is not allowed, a Slot# of zero indicates that this InstanceMethodRef has not be resolved. In this case, the JEM opcodes will trap to software to resolve the slot number and number of argument and replace the entries in the InstanceMethodRef.
7. ClassMethodRefs provide a location for class methods for this and other classes and contain a MethodBlk pointer and a CSA pointer. The MethodBlk pointer provides the physical byte address of the method, and the CSA pointer indicates the CSA for the class of that method. A MethodBlk pointer of null indicates that the ClassMethodRef has not been resolved. In this case, the JEM opcodes will trap to software to resolve the ClassMethodRef and replace the MethodBlk pointer and CSA pointer entries.
8. InterfaceMethod Refs provide a locator for an object's interface methods and contain an IntfID value and an ISlot# value. The IntfID value is a unique value identifying the interface to find. The object's Interfaces list has an Interface Method Table for this IntfID. The ISlot# value in the InterfaceMethodRef identifies an entry in that Interface Method Table. The identified entry is a slot number for the object's CSA virtual method table. This latter entry, in turn, has a MethodBlk pointer and CSA pointer for the method to be invoked. The use of zero for a valid interface ID is not allowed. Accordingly, an IntfID value of zero indicates that the InterfaceMethodRef has not been resolved. In this case, the appropriate instruction opcode will trap to software to resolve the InterfaceMethodRef and replace the IntfID and ISlot# entry values.
9. StringRefs provide a locator to a string from an entry of the class file CONSTANT_String_info, which entry is needed by code in one of the methods of this class. This string will have been stored with the other strings of the processor java/lang/String runtime.

10. SingleWordRefs provide 32-bit constant data from an entry in either the class file CONSTANT_Integer_info or the class file CONSTANT_Float_info.
11. DoubleWordRefs provide 64-bit constant data from an entry in either the class file CONSTANT_Long_info or the class file CONSTANT_Double_info.

Figure 4:
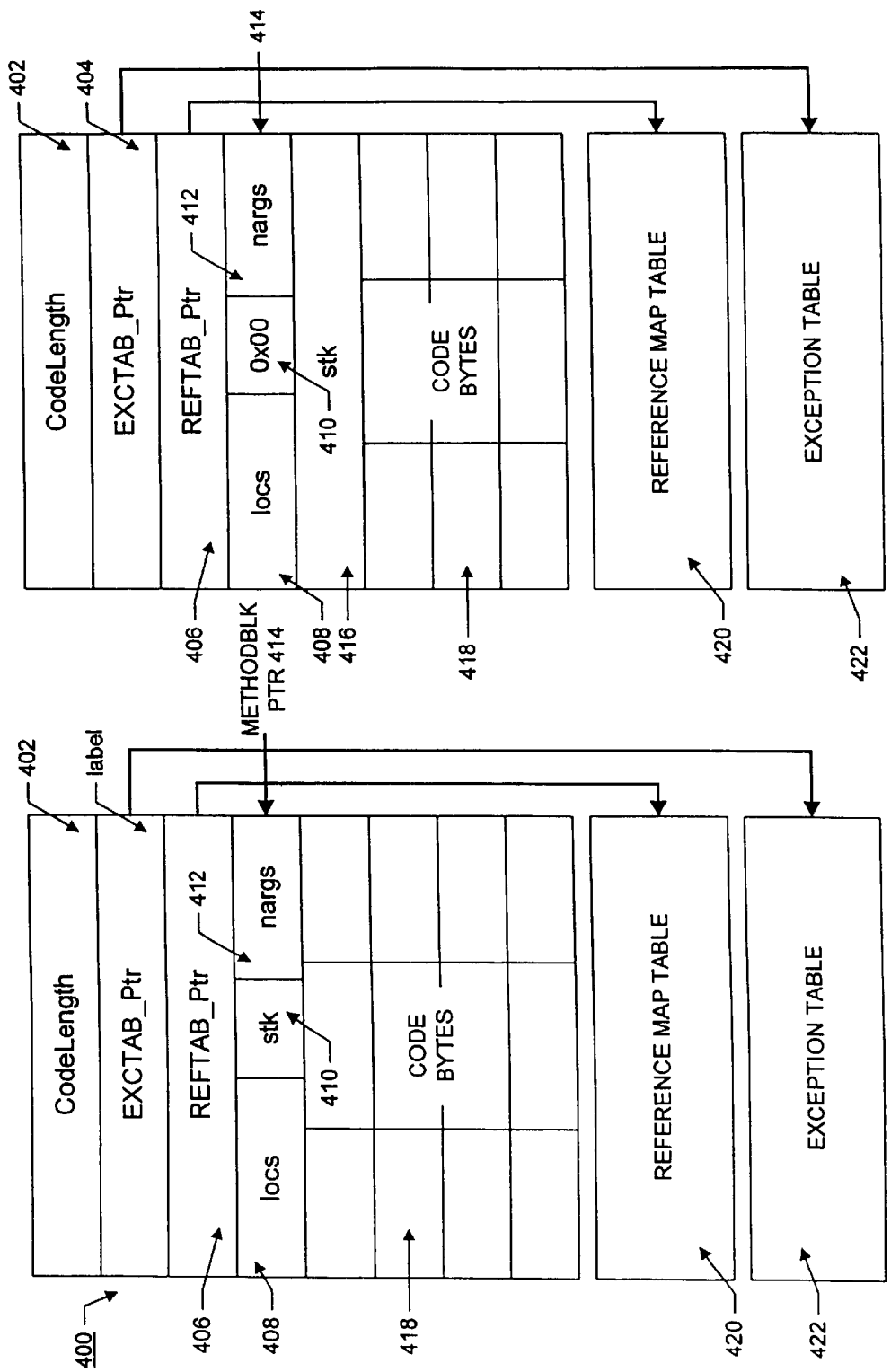
FIGS. 4A and 4B are schematic diagrams of method blocks for "small" and "large" stacks, respectively.

The CSA also contains method blocks which, as previously mentioned, include the opcodes for the methods used in the class. There are two types of method blocks: one for methods with "small" accumulator stacks and another for methods with "large" accumulator stacks. The method block which is used with small stacks (less than 256 words) is illustrated in FIG. 4A. The method block which is used with large stacks (more than 256 words) is illustrated in FIG. 4B. As illustrated in both figures, a method block 400 contains the following fields:

1. CodeLength field 402 which specifies the number of code bytes in method block 400;
2. EXCTAB_Ptr field 404 which contains a pointer to the Exception Table 422 (described below) for method block 400;
3. REFTAB_Ptr field 406 which contains a pointer to the Reference Map Table 420 (described below) for method block 400;
4. nargs field 412 which contains the number of 32-bit words passed to this method. The nargs field includes the objectref value for virtual methods;
5. stk field 410 (small stack method block) or 416 (large stack method block) which contains the maximum space (in 32-bit words) that this method needs for its stack mark and accumulator stack. stk equals 5+max_stack (specified in the class file).
6. locs field 408 contains the number of new 32-bit words that need to be allocated to the local environment when this method is invoked. These new words and those parameters pushed by the invoker make up the local environment for this method.
7. Code Bytes field 418 contains the stream of bytecodes for this method.

The Reference Map Table 420 for a method contains information identifying which elements in the accumulator stack are of type "reference". This information is available for garbage collection routines to correctly identify objects in use. Each entry in the table contains:

1. An unsigned 16-bit start program counter. Typically, this identifies the byte offset of the opcode that puts the reference on the stack.
2. An unsigned 16-bit end program counter. Typically, this identifies the byte offset of the last byte of the opcode that takes the reference off the stack.
3. An unsigned 32-bit accumulator stack offset count. This identifies the 32-bit word offset into the accumulator stack for the value that is a reference. The zeroth entry is the word closest to the stack mark.

All program counter offsets in the table are offsets from the start of the method code. A REFTAB_Ptr of null or a size of zero indicates that there are no reference values on the accumulator stack throughout this method.

The Exception Table 422 for a method contains information identifying exceptions that are handled by code in the associated method block, as well as information which assists exception handling routines to identify exception handlers when an exception occurs. Each entry in the table contains the following fields:

1. An unsigned 16-bit start program counter field which identifies the byte offset of the start of a range of opcodes for which the exception handler is valid;
2. An unsigned 16-bit end program counter field which identifies the byte offset of the last byte of opcodes for which the exception handler is valid;
3. An unsigned 16-bit exception handle field which identifies the byte offset of the first opcode of the exception handler;
4. An unsigned 16-bit exception index field which locates a ClassRef in the CSA Indexed Area that identifies the exception class.

All program counter offsets in the table are offsets from the start of the method code. An EXCTAB_Ptr 404 of null or of a zero size indicates that there are no exception handlers in this method block.

Figure 5:
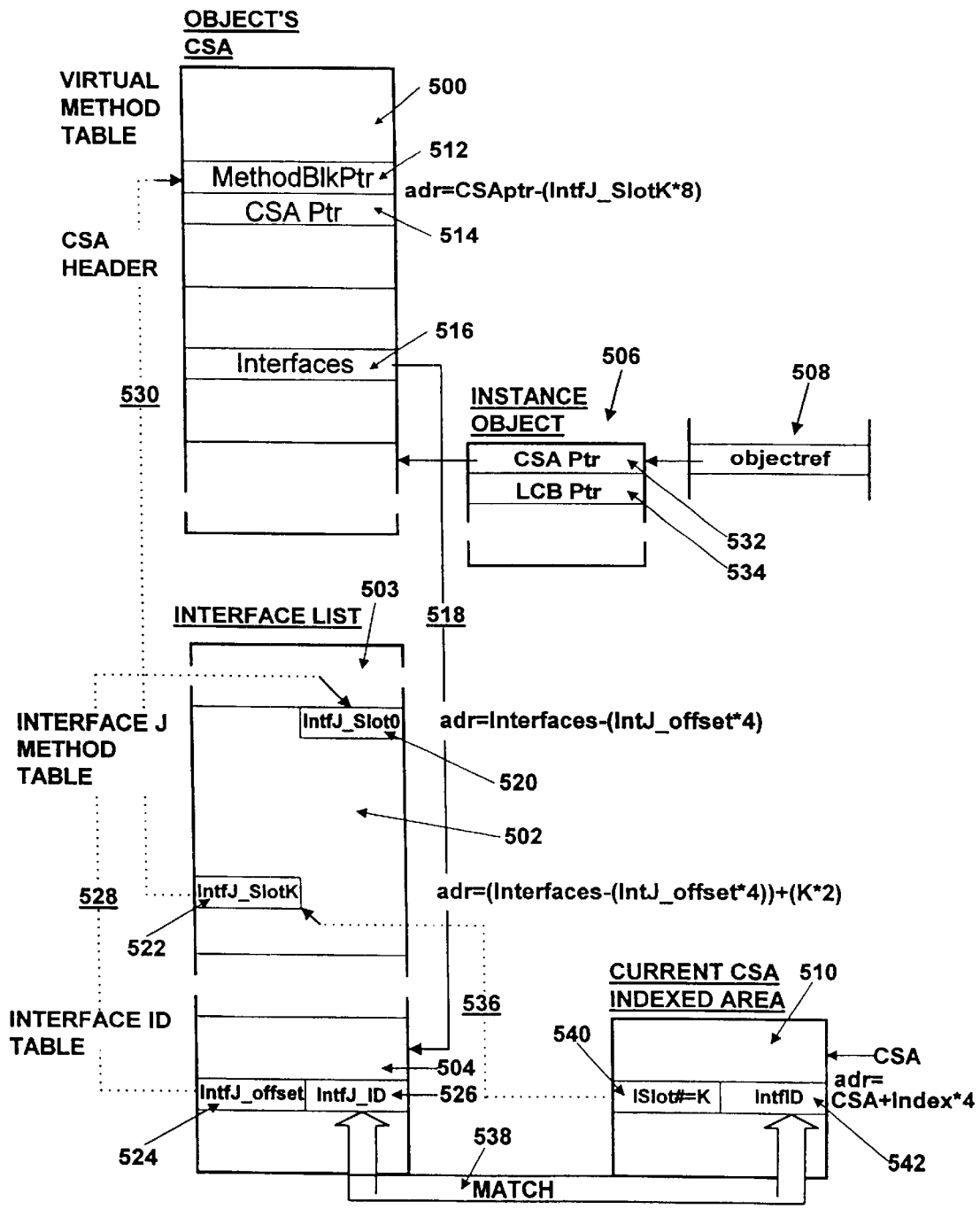
FIG. 5 is a block schematic diagram illustrating the relationship between virtual method tables, object CSA headers, interface method tables and interface ID tables.

The class interface list is a double-ended list structure containing an interface ID table and a set of interface method tables. The relation of the interface ID table and interface method tables with the CSA header and CSA indexed area is illustrated in FIG. 5. The interface ID table 502 is located by the Interfaces entry 516 in the CSA header 500 as indicated by arrow 518. Each entry in the interface ID table 504 identifies an interface implemented by the class represented by the CSA. If this class implements no interfaces, then the Interfaces pointer 516 in the CSA header 500 is null or the size of the interface ID table 504 is zero. The interface ID table 504 is created at the time the class and corresponding CSA are created.

The interface ID table 504 is an array of pairs of 16-bit entries of which one entry comprised of two parts, 524 and 526. For each interface J of the class, the corresponding entry has an interface ID value, designated as IntfJ_ID 526 and an interface method table offset value, designated as IntfJ_offset 524. Each of these values identify a unique interface implemented by the class. The IntfID value 542 in the InterfaceMethodRef entry in the indexed CSA area 510 (discussed above) is used as a key to select an entry with a corresponding IntfJ_ID value 526 in the interface ID table 504 as indicated by arrow 538. The value pairs in the Interface ID table 504 must be sorted in ascending order according to the IntfJ_IDs to accommodate binary searches performed by processor to select the entry. From the selected IntfJ_ID entry 526, the interface method table offset 524 identifies the interface method table 502 associated with this interface as indicated by arrow 528. The IntJ_offset value is an unsigned 16-bit value providing a word offset that is subtracted from the Interfaces pointer 516 to locate the beginning of table 502. An IntfJ_ID value and an IntfJ_offset value of zero signifies that the interface entry has not be resolved.

Interface method tables, such as table 502, are created either at the time the class is created or at a later time when the interface through this class is accessed. Therefore, there must be at least as many entries in the interface ID table 504 as there are interface method tables 502. When all Interfaces for this class have been resolved, there must be exactly the same number of entries in the interface ID table as there are interface method tables.

An interface method table, such as table 502 is an array of unsigned 16-bit virtual method slot numbers. There is one interface method table for each interface implemented by the class. An interface method table is selected through the interface ID table, as discussed above. The ISlot# value 540 from the InterfaceMethodRef value in the indexed CSA area 510 selects an entry in the selected interface method table 502 as shown by arrow 536 in FIG. 5. This entry contains a virtual method slot number, IntfJ_SlotK 522 identifying an entry in the virtual method table 500 for this class as shown by arrow 530. This entry contains the MethodBlk pointer 512 and CSA pointer 514 for the method requested.

The basic storage unit for JEM processor is the object. All objects exist on 32-bit word boundaries. There are two types of object data structures: object instances which contain a user-defined fields and are instances of the class "object", and arrays. Objects are located by an objectref or arrayref pointer and contain two parts: a header and a data area. All objectrefs and object pointers have a low-order address bit, A[1:0], set to zero. This places the object on a 32-bit word boundary. The object header contains an OBJ_CSA_Ptr pointer to the Class Static Area (CSA) which is described above. The object header also contains an OBJ_LCB_Ptr pointer to a Lock Control Block (LCB) for this object. When this pointer is null, there is no lock on this object. Lock Control Blocks are used to control access to the object and are discussed below.

Figure 6:
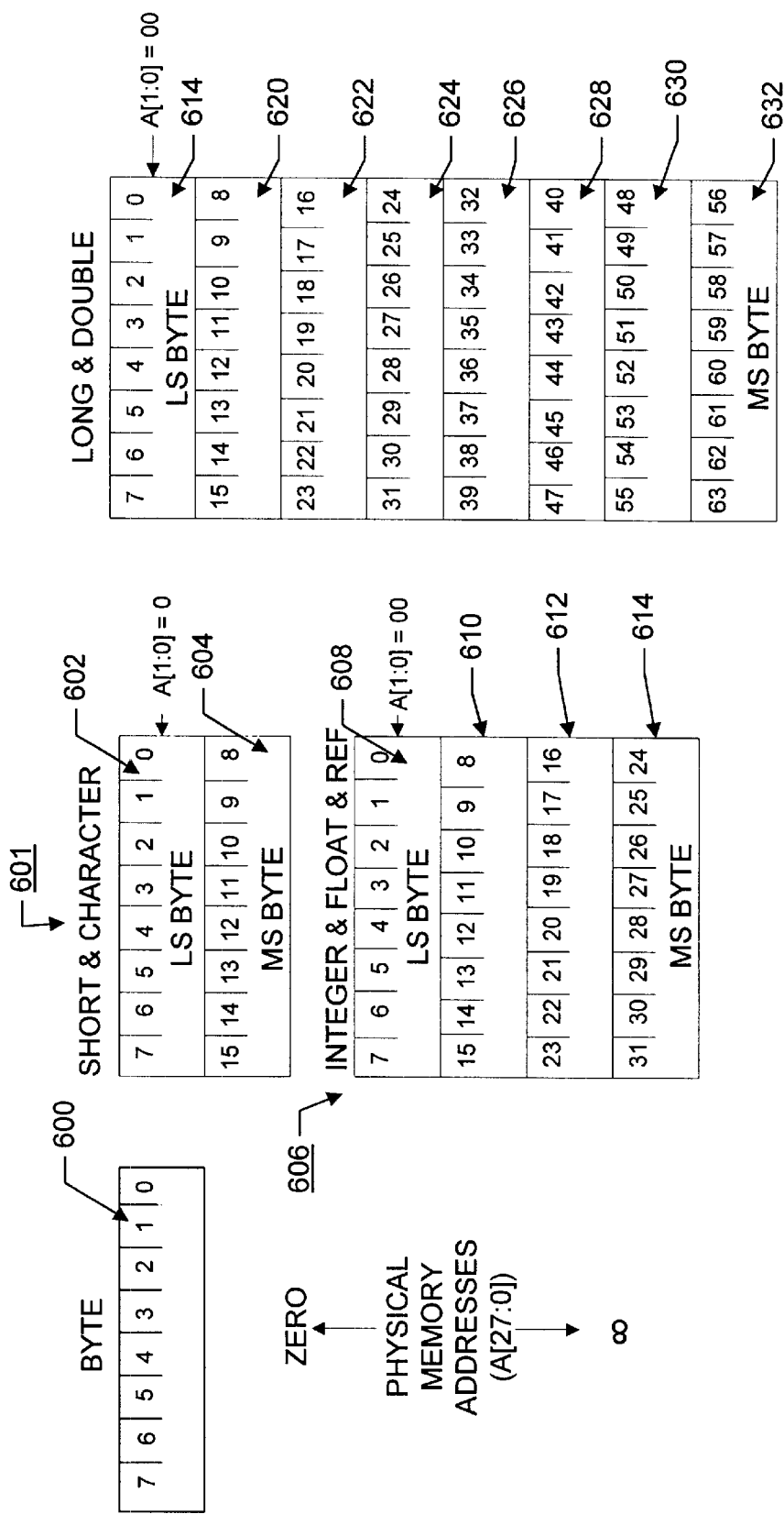
FIG. 6 is a schematic diagram showing storage requirements of various primitive data types used in the inventive system.

The JVM, and therefore JEM, supports data storage of 8-, 16-, 32-, and 64-bit fields in objects and arrays. JEM also supports 1-bit arrays. Bytes consume 8 bits, shorts and characters consume 16 bits, integers, floats, objectrefs and arrayrefs consume 32 bits, and longs and doubles consume 64 bits. FIG. 6 illustrates the binary memory storage requirements for the various data types that may be used in Java programs. In particular, FIG. 6 illustrates scalar data storage for an 8-bit system. The basic 8-bit byte 600 is shown in "little-endian" format. Since the JEM processor is a 32-bit machine, memory is organized logically as four single byte fields. Memory locations are accessed by a 28 bit address designed as A[27:0]. The least significant 2 address bits A[1:0] provide a two-bit code which selects one the 4 bytes in each 32-bit memory location to provide addressability at the byte level.

The primitive data types to be stored are character, short, integer, float, reference, long and double. The short and character types 601 are stored two to a word with the least significant (LS) byte 602 located at addresses A[1:0]=00 and A[1:0]=10 and the most significant (MS) byte 604 at addresses A[1:0]=01 and A[1:0]=11. The integer, float and reference data types 606 are stored one to a word consuming all four bytes 608–614 with the least LS byte 608 located at address A[1:0]=00 and the most significant byte 614 at address A[1:0]=11. The long and double data types 616 consume two words or eight bytes 618–632 with the LS byte 618 at address A[1:0]=00 and the MS byte 632 at address A[1:0]=11.

Figure 7:
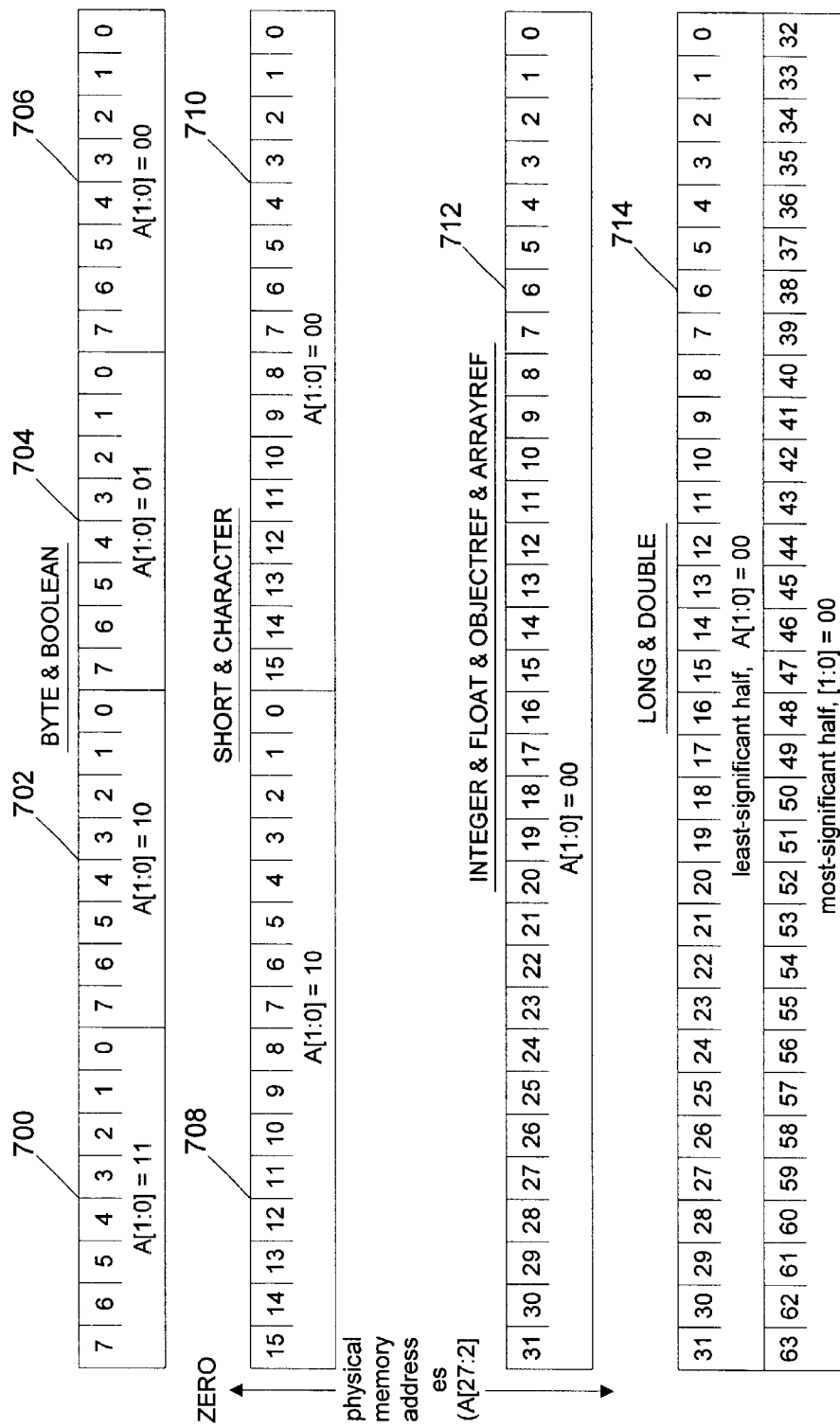
FIG. 7 is a schematic diagram illustrating how various data types are stored in the 32-bit words used in the inventive system.

The JEM processor imposes some limitations on the arrangement of data in memory. In particular, 16-bit data (short and character) must reside in the lower or upper half of the 32-bit word and 32- and 64-bit data (integer, float, reference, long, and double) must reside aligned on 32-bit word boundary. FIG. 7 illustrates the organization of data storage by type in 32-bit format. Four byte and boolean values 700–706 can be stored in one word, each starts at addresses A[1:0]=00, 01, 10 and 11, respectively. Two short and character values 708 and 710 are stored in each word at starting addresses A[1:0]=00 and 10, respectively. A single integer, float, objectref and arrayref value 712 is stored in each word at starting address A[1:0]=00. Finally the long and double values consume two words 714 and 716 with the least significant half at starting address A[1:0]=00 and the most significant half at starting address A[1:0]=00. Note that FIGS. 6 and 7 do not illustrate objects, but merely indicate the arrangement of data within objects.

Arrays are stored in little-endian zero-based format. The location of the elements in the array are restricted as specified above in connection with FIGS. 6 and 7. Arrays are objects and, as such, contain an object header along with a data area. The data area in arrays contain a 32-bit array_size followed by the array elements. The array_size has an integer type, but must not be negative. Arrays with elements less than 32 bits in size are packed and filled with zeros to fill out the last 32-bit word. Multidimensional arrays are configured as an array of arrayref pointers to a number of arrays, which may contain arrayref pointers to even more arrays.

User-defined objects created from a JVM class file contain a varying number of instance fields of varying types. As discussed above, these objects are stored in structures containing an object header and the data and are word-aligned. By definition, the data for these user-defined objects contains the fields for this class as well as all superclasses for this class. Only instance fields (not static) are stored in instance objects. The field list in the class file defines the format for the data in the object. Data is stored, and packed when possible, in the order that it is specified in the class file.

Figure 8:
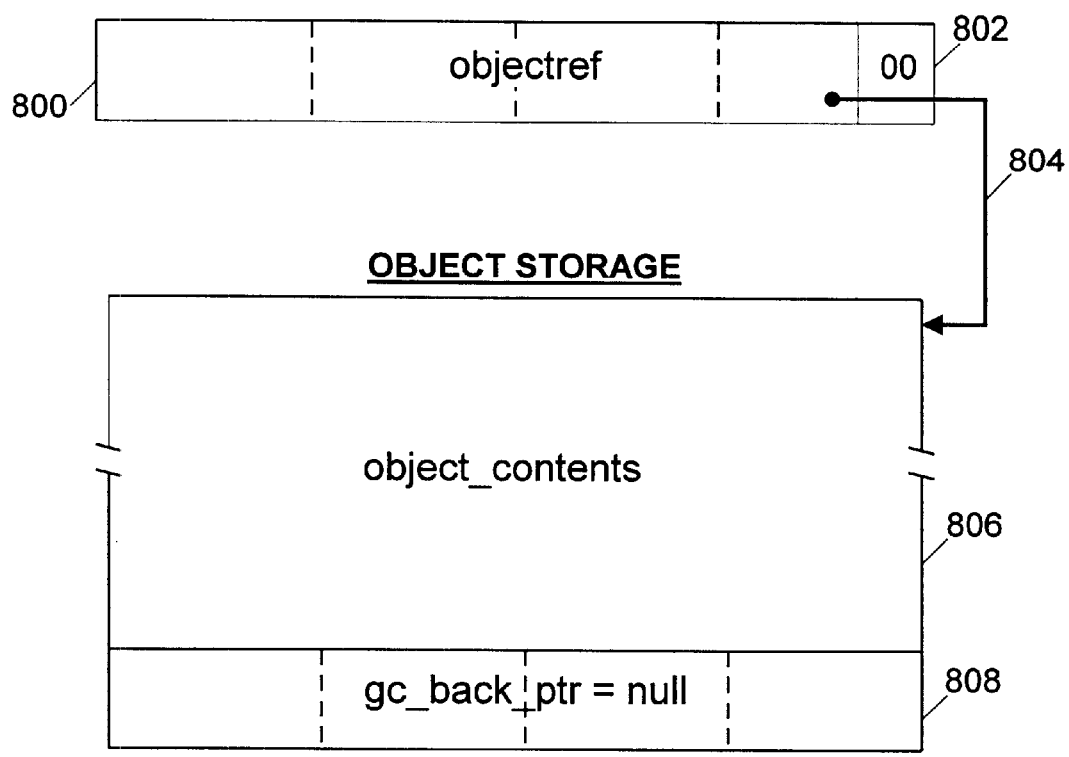
FIG. 8 schematically illustrates an object data storage format used in the inventive system to efficiently store JAVA object data.

A symbolic representation of the object storage mechanism for objects is shown in FIG. 8. Objects which are not subject to a conventional memory management technique known as "garbage collection" are identified by the presence of "00" in the D[1:0] bit positions 802 of the objectref reference field 800. The use of these latter bits 902 for garbage collection control is possible because the low two address bits are used for byte addressability, but objects are always word-aligned. The non-garbage-collected addressing method uses a single-referenced addressing with a single level of indirect addressing to point to the physical memory address 806 as indicated by arrow 804. This results in a generally simplified object access mechanism which requires less processing and hence offers greater speed. In the case of a non-garbage-collected object a back pointer 808 is set to null.

Synchronization is performed in the JVM by means of locking statements. The JAVA synchronized statement computes a reference to an object and then attempts to perform a lock operation on that object. A JAVA program executing the statement does not proceed further until the lock operation has successfully completed. After the lock operation has been successfully performed, the body of the synchronized statement is executed. When execution of the statement body is completed, either normally or abnormally, an unlock operation is automatically performed to release the lock.

A JAVA synchronized method automatically performs a lock operation when it is invoked and, as with the synchronized statement, the method body is not executed until the lock operation has successfully completed. If the method is an instance method, it controls a lock associated with the instance for which it was invoked. If the method is static, it operates with a lock associated with the class object that represents the class in which the method is defined. When execution of the method body is completed, either normally or abnormally, an unlock operation is automatically performed to release the lock.

The aforementioned JAVA synchronization is directly supported by JEM data structures. All instance objects as well as class objects have a "lock control block pointer" (LCB_Ptr) entry. This pointer locates a lock control block which identifies the state of a lock on that object. Lock control blocks are only needed for those objects which are locked at some time during their existence. For those objects that are never locked, the LCB_Ptr is null.

Locks are needed for instance and class objects in three configurations. A synchronized instance method has a lock control block that is located by an LCB_Ptr in the instance object. A synchronized class method has a lock control block that is located by an LCB_Ptr in the class object. A synchronized instance has a lock control block that is located by an LCB_Ptr in the instance object.

Figure 9:
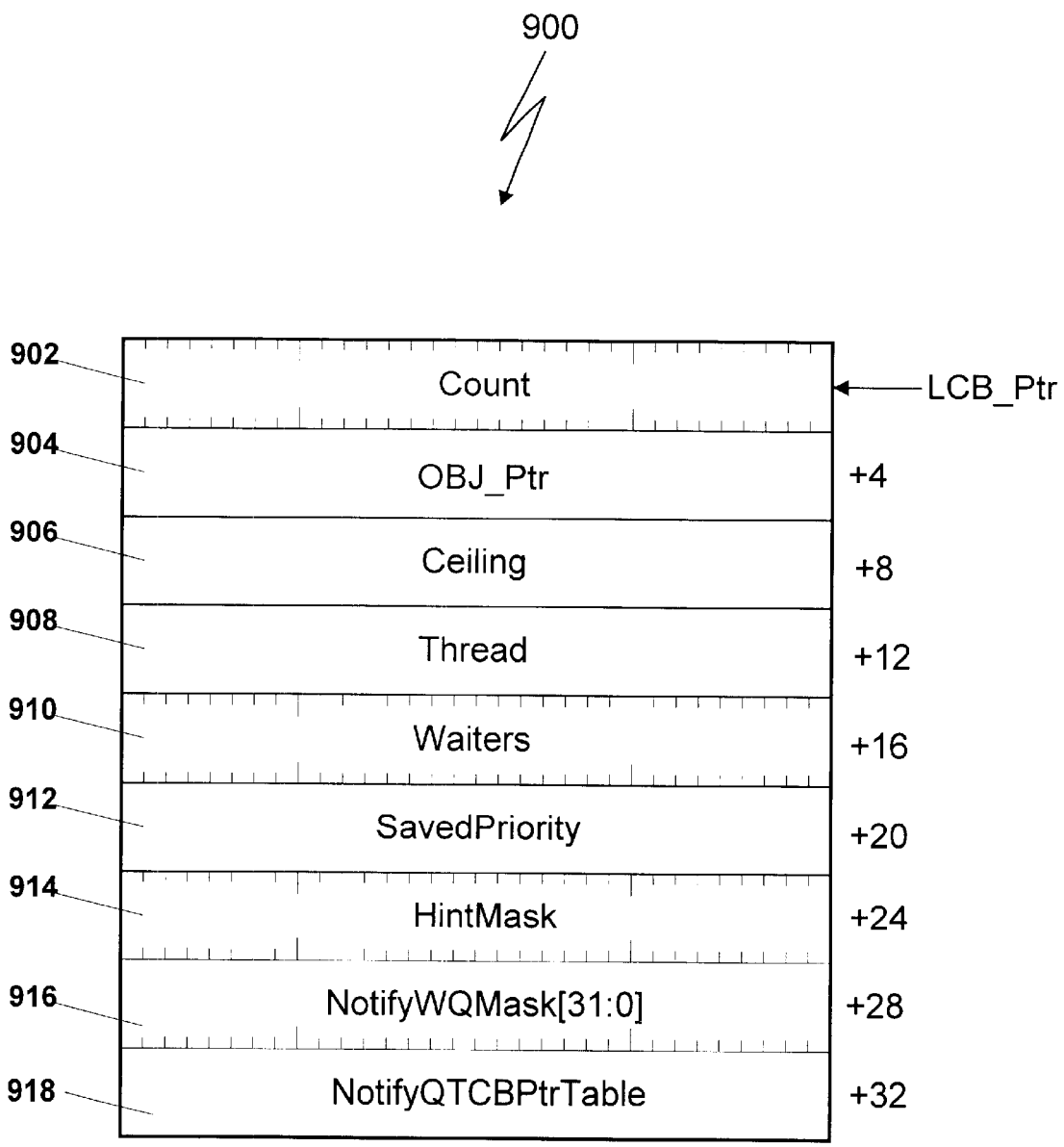
FIG. 9 is a schematic diagram of a lock control block showing the contents thereof.

As shown in FIG. 9, data in the lock control block 900 defines the state of the lock on an object, which data consists of eight entries:
1. The "count field" 902 is a 15-bit value that indicates the number of times the object has been locked. A count of zero indicates that the object is unlocked. A count of one indicates that the object has been locked once. Counts of more than one may occur if a thread relocks an object which it currently has locked.
2. The OBJ_Ptr field 904 holds a 32-bit pointer to the object that this lock control block controls.
3. The ceiling field 906 holds a ceiling value.
4. The "thread field" 908 holds a 32-bit pointer to the thread control block (discussed below) for the thread that owns this lock. When the corresponding object is unlocked (count value=0), the thread pointer is null.
5. The "waiters field" 910 holds a 32-bit pointer that locates a linked list of threads waiting for this lock.
6. The SavedPriority field 912 holds a saved priority value.
7. HintMask field 914 is 32 one-bit flags indicating which entries in the NotifyQTCB table have more than thread control block in their queue.
8. The "NotifyWQMask field" 916 is a field having 32 one-bit flags indicating which entries in the NotifyQTCB table have at least one thread control block in their queue.
9. The "NotifyQTCBPtrTable field" 918 holds a 32-bit pointer to a prioritized table of queues of thread control blocks for threads waiting for a notify.

When an object is created it has a null LCB_Ptr. At the first need for synchronization, a lock control block is allocated from memory. If a lock control block is successfully allocated, the LCB count field is incremented, indicating the object is locked and pointers to the object and the current thread control block are added. Unlocking for each synchronization request after the first is simply performed by decrementing the lock count field and setting the thread pointer field to null.

The JEM processor can operate in one of two operating modes: executive mode and user mode. When operating in executive mode, the processor performs supervisory and privileged operations. When operating in user mode, the processor executes applications and applets. During executive mode operation, any active user threads are suspended. During user mode operation, the executive thread is not active and is waiting to be initialized by an interrupt or user request. Thread control and context switching between executive mode and user mode is based on thread control blocks (TCBs). Each thread control block defines the state of a suspended user thread to allow multi-threaded operation on single-threaded CPU hardware.

Figure 10:
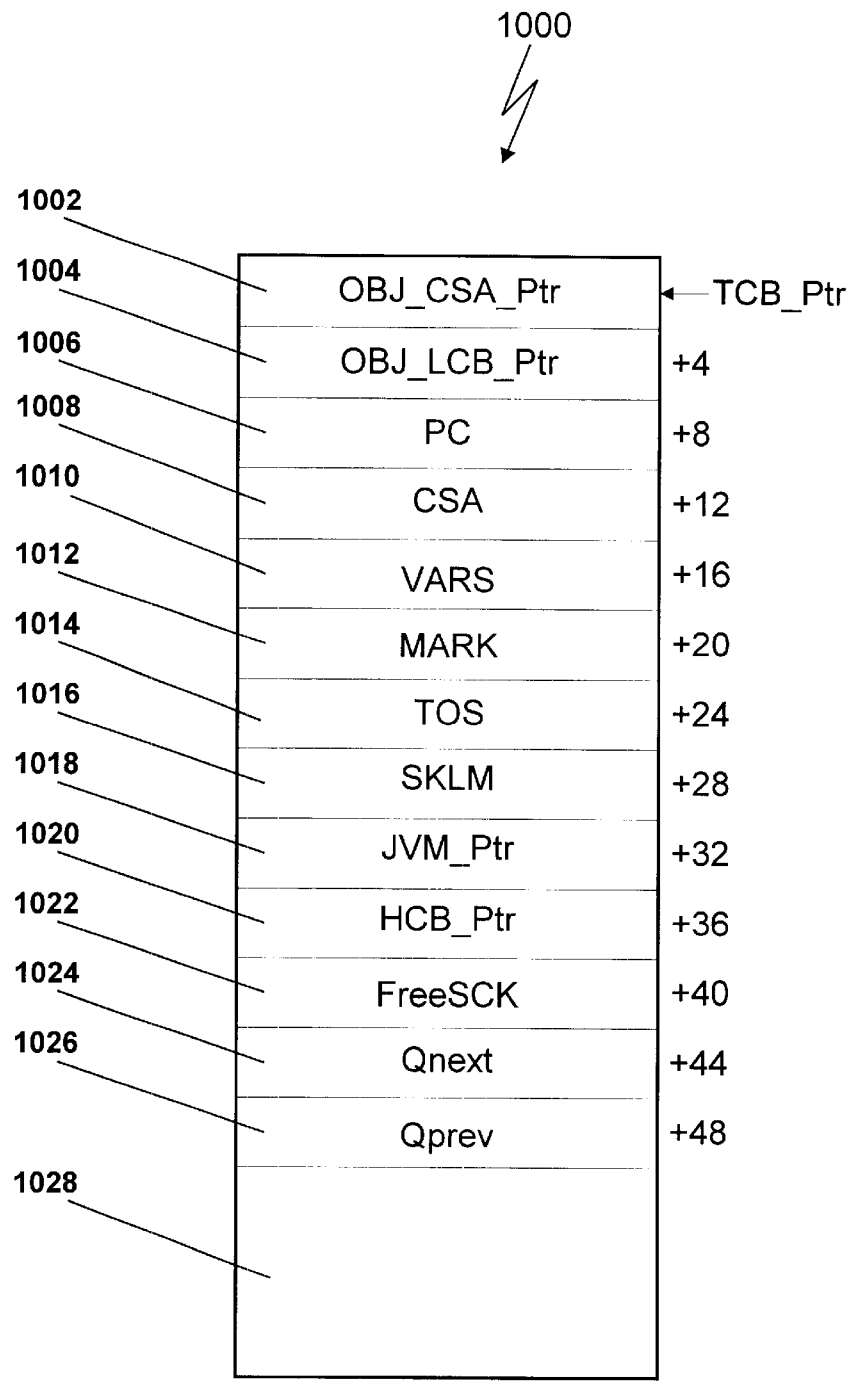
FIG. 10 is a schematic diagram of a thread control block showing the contents thereof.

FIG. 10 shows the contents of a TCB 1000 needed for microcoded context switching. TCBs are constructed to look like a JAVA object so that the fields can be easily manipulated by the existing JAVA software. The TCB fields include the usual OBJ_CSA_Ptr and OBJ_LCB_Ptr fields, 1002 and 1004, respectively, which point to the CSA area and lock control blocks and also include the following fields:
1. PC field 1006 which is a 32-bit field that saves the program counter of a suspended thread or contains the MethodBlk pointer for a thread's main method prior to initialization of the thread.
2. The CSA field 1008 which is a 32-bit field that saves the class CSA pointer of a suspended thread or contains the CSA pointer for the class of a thread's main method prior to initialization of the thread.
3. The VARS field 1010 which is a 32-bit field that saves the pointer to the current local environment of a suspended thread. This field is null prior to thread initialization.
4. The MARK field 1012 which is a 32-bit field that saves the pointer to the current stack mark of a suspended thread. This field is null prior to thread initialization.
5. The TOS field 1014 which is a 32-bit field that saves the current top-of-stack pointer of a thread.
6. The SKLM field 1016 which is a 32-bit field that saves the current stack limit pointer of a thread.
7. The JVM_Ptr field 1018 which is a 32-bit field that contains a pointer which locates a JVM Control Block for the JVM that this thread executes in.
8. The HCB_Ptr field 1020 which is a 32-bit field that contains a pointer which locates a heap control block for this thread.
9. The Free SCK field 1022 which is a 32-bit field which contains a pointer that locates a linked list of free stack chunks. This field is null for an empty list of SCKs.
10. The Qnext field 1024 which is a 32-bit field containing a pointer that locates the next thread control block in a circular thread queue or in a lock waiters list.
11. The Qprev field 1026 which is a 32-bit field containing a pointer that locates the previous thread control block in a circular thread queue. Qprev is null when the thread control block is in a lock waiters list. Qprev and Qnext provide a doubly linked, forward and backward, structure.
12. Additional space 1028 is available for thread scheduling software.

TCBs contain the processor state for a user thread when that thread is suspended or not yet initialized. Most of the processor state for the currently active thread is held in CPU registers. During a context switch, the processor state in the CPU registers is transferred to the appropriate TCB or the processor state in the new TCB is transferred to the CPU registers.

Figure 11A:
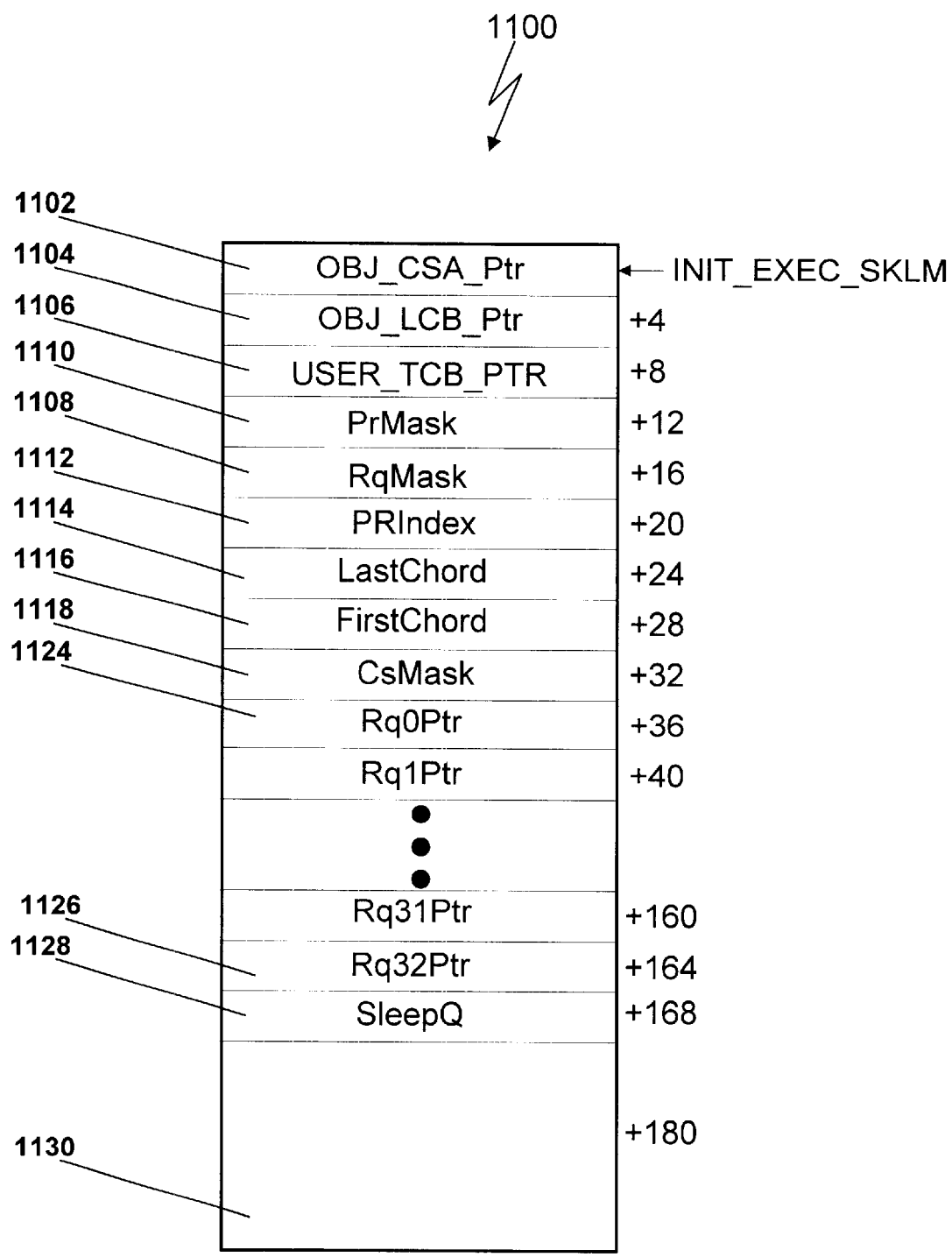
FIG. 11A is a schematic diagram of an executive control block showing the contents thereof.

A slightly different control block is used for context switching of an executive mode thread. This control block is called an executive control block (ECB) and is illustrated in FIG. 11A. Executive control blocks are also constructed to look like a JAVA object to allow easy manipulation of the fields by software. The Executive Control Block is located by the overloaded INIT_EXEC_SKLM pointer and participates in scheduling of periodic threads. The executive uses a "piano roll" metaphor to process periodic or "cyclic" threads. The piano roll is a list of entries called "chords" which are periodically replayed in a fixed order. The piano roll is driven by a periodic interrupt called a "tick" which is usually generated by a hardware timer. Each piano roll entry is a one-word, bit-mapped chord wherein each bit corresponds to a thread. Bits which are set indicate which threads should be made ready when the chord is "played." The "piano roll" mechanism is discussed in detail below. A ready queue maintains a prioritized list of JVM threads eligible to run. The JEM microcode directly manipulates the ready queue and other threading control structures, in a manner determined by a predetermined priority scheme.

The ECB fields shown include fields which facilitate this piano roll and priority mechanism. These fields include:
1. USER_TCB_PTR 1106 which is a 32-bit pointer which locates the currently-active user Thread Control Block.
2. PrMask field 1110 is a bit mask which masks out empty periodic priority queues in the ready queue. The PrMask bit mask field is normally equal to the RqMask bit mask field. However, if all threads at a periodic priority level should become blocked, the PrMask bit corresponding to that level is cleared. The PrMask field can be logically ANDed with a field representing a piano roll chord. If this logical operation is performed before the chord is ORed with the RqMask field, it prevents turning on empty periodic priority levels. The piano roll operation is described in detail below.

3. RqMask field 1108 which is a bit mask that identifies occupied ready queue priority levels. It aids rapid lookup of the highest priority ready thread.
4. PRIndex field 1112 is a pointer to the current piano roll chord.
5. LastChord field 1114 is a pointer which points to the last chord in the piano roll.
6. FirstChord field 1116 is a pointer which points to the first chord in the piano roll.
7. CsMask field 1118 is a bit mask which identifies periodic priority levels that have experienced one or more instances of "cycle slip" as described below.
8. an RqPtrArray comprised of fields Rq0Ptr 1124 through Rq32Ptr 1126 is used as the "ready queue". It is organized as an array of doubly-linked TCB lists, where each array element corresponds to a priority level. The individual lists are known as "priority queues".
9. SleepQ field 1128 is a pointer to a doubly-linked list of thread control blocks for threads delayed due to certain thread operations such as joins, waits, and sleeps.
10. Additional space 1130 is available for thread scheduling software.

In a multi-threaded system, the decision concerning which thread to run at any particular moment is made in accordance with a scheduling policy. The conventional JAVA scheduling policy is defined in the JAVA Language Specification, Section 17.12 and a conventional JAVA JVM effectively implements a preemptive, priority-based scheduling policy which is supported by the JEM processor. Threads are dispatched (i.e., scheduled to run) in accordance with the following rules:

1. The currently executing thread is always the highest priority runnable thread.
2. If a blocked higher priority thread becomes runnable during the execution of a lower priority thread, the lower priority thread is preempted and the higher priority thread executed.
3. Equal priority threads are dispatched in round-robin order.

In the inventive JEM processor, a priority-based scheduler which conforms to the above-described rules dispatches (makes ready to execute) the highest priority thread from the set of all runnable, or "ready", threads. In a real-time embedded system, this choice should be made quickly, so the data structure used to represent all ready threads should facilitate fast lookup of the highest priority thread. A data structure called a "ready" queue is used to store ready threads. The threads in the ready queue are represented by thread control blocks. A thread is "in" the ready queue if the ready queue contains that thread's TCB. The ready queue implemented with fields 1124–1126 is a 32 priority level queue which uses a bit mask (field 1108) to speed thread dispatch.

Figure 11B:
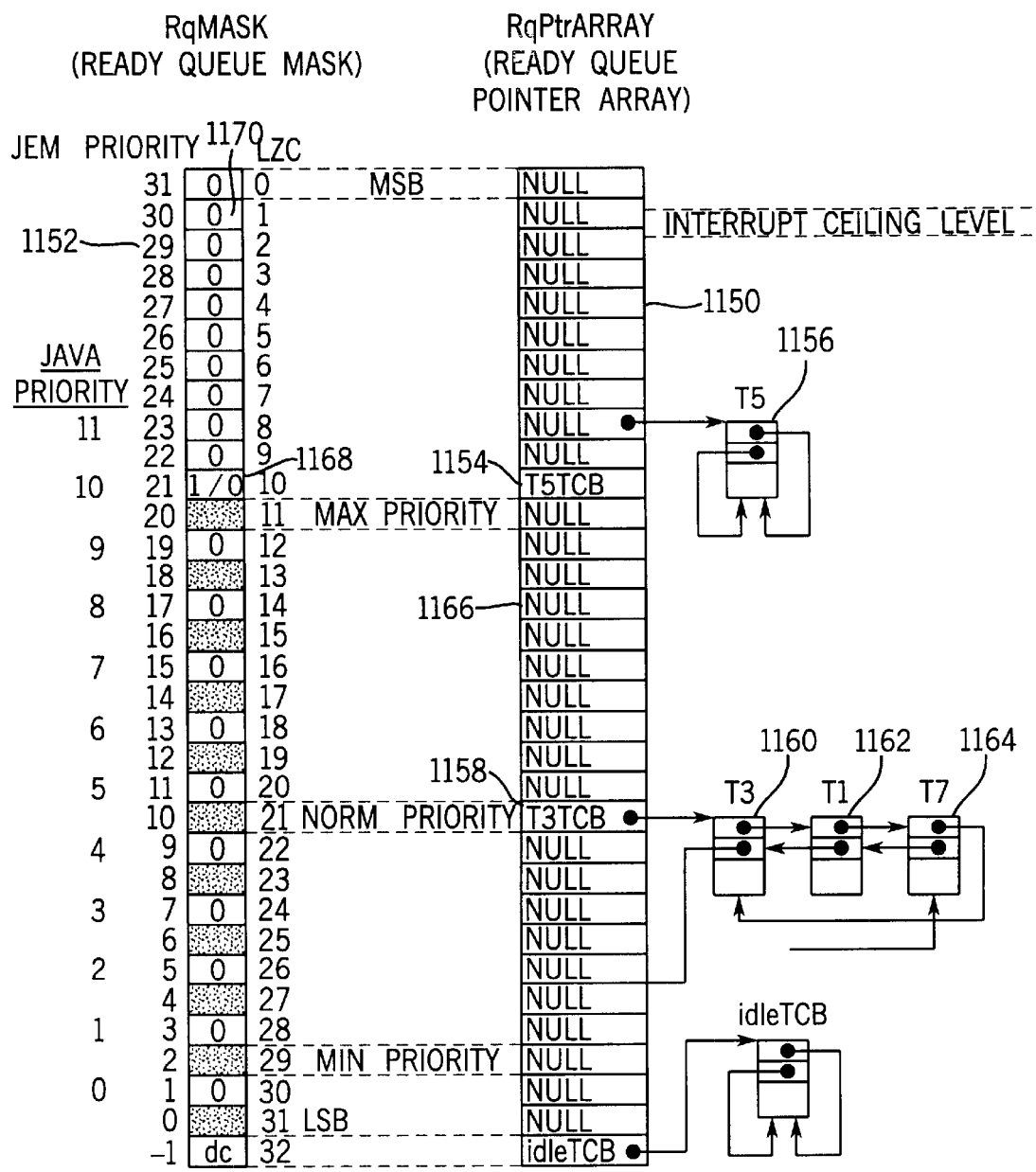
FIG. 11B is a schematic diagram of the RqMask field and RqPtr array in the executive control block.

As shown in FIG. 11B, the ready queue consists of the RqPtrArray 1150. In the ready queue 1150, each active priority level has its own doubly-linked list of TCBs, and a global variable is used to represent each list. For example, JEM priority level 21 contains a pointer T5TCB (1154) which points to a linked list starting with TCB T5 (1156). In this list there is only a single member 1156. Similarly, priority level 10 contains a pointer T3TCB (1158) which points to a TCB list containing three linked TCBs 1160, 1162 and 1164. The individual linked lists are known as "priority queues" and the global variables (1154, 1158) reside in the ready queue 1150 which is effectively a pointer array. There are 32 JEM priority levels, running from 0 to 31. Empty priority levels, such as level 1166, have null pointers in the corresponding array entries. Queue insertion is accomplished in constant time, since the thread priority may be used as an index into the pointer array. Thread dispatch requires a linear search through the pointer array which is facilitated by the bit mask field 1152. The bit mask 1152 maps directly to the linked list pointer array with one bit for each level. The highest occupied priority level can be located by finding the first set bit (i.e., counting the leading zeros) in the bit mask 1152. As shown in FIG. 11B, this level 1168 corresponds to priority level 21.

The bit mask 1152 is sized so that there is a one-to-one mapping from each bit to each entry in the pointer array. Priorities are mapped into the pointer array so that the highest priority level resides at array index 0 and the leading (starting at the MSB of the mask 1152) zero count identifies the highest priority queue. With the bit mask/pointer array approach, the many queue manipulation operations are constant-time and fast, including dispatch of highest priority ready thread, queue insertion before/after the queue head, queue head deletion, queue insertion after the queue tail, queue "head-becomes-tail" rotations and queue deletions.

JAVA priority ranges is defined by two constants: MIN_PRIORITY and MAX_PRIORITY found in the shared JAVA class, classjava.lang.Thread. The current values of these constant are 1 and 10, respectively. A further constant called NORM_PRIORITY (=5) defines the default thread priority. In accordance with the JAVA specification, an applet's priority cannot exceed NORM_PRIORITY+1. JAVA priorities 1 to 10 are mapped to priority levels 2, 4, 6, 8, 10, 12, 14, 16, 18, and 20 in the JEM processor. This mapping is performed by multiplying the JAVA priority by a further constant called the JEM.Configuration.priorityMultiplier(=2). This mapping allows two JEM priority levels to be associated with each JAVA priority level: one level for periodic threads and one level for non-periodic threads.

JEM priorities 3, 5, 7, 9, 11, 13, 15, 17, 19, and 21 are reserved for periodic threads controlled by the piano roll mechanism as described below. Each "periodic" priority level is one higher than its corresponding aperiodic level, thus giving dispatch preference to cyclic threads. Priority level 31 (1170) is reserved for the "interrupt" priority ceiling level. This priority is used to create uninterruptible JEM user mode critical sections so that object locks may be shared between executive and user modes. The remaining priority levels, 0, 1, and 22–30, are reserved for JAVA daemon threads.

A context switch involving an executive mode thread takes place as follows. At reset, the processor is put in executive mode and an automatic call to the reset method is performed. There is no TCB used at this point, since no processing has been performed prior to reset. This reset method is considered the "outer" executive method at this point. The reset method continues execution until a return instruction is reached in this outer executive method. Since there is nowhere to return to, this outer method return is used in the JEM processor to activate a user thread. The outer method return leaves the executive stack empty as it was at reset.

The user thread to be activated is defined by a TCB that has been created by the executive reset method software. The user thread is initialized and execution begins with the first instruction of its "outer" method. The user thread continues execution until one of four events occurs: 1) an interrupt occurs that requires executive intervention, 2) a software TRAP instruction occurs that requires executive intervention, 3) an built-in trap occurs requiring executive intervention, or 4) a return instruction is executed in the user thread outer method. When one of these events occurs, the current state of the user thread is saved in the user TCB and a context switch is made to the executive method identified to handle the event.

Executive activation at this point is much like that of reset. An automatic call is made to the executive method identified and execution commences with the first instruction in that method. Execution continues until this outer executive method's return at which time a user task is activated. The user task that is activated may be the continuation of the one previously described or may be the initiation of a new user task all of which is up to the executive software controlling user TCBs.

The aforementioned context switch operation is used to implement multiple JVMs which operate concurrently on a single processor. In particular, each JVM operates in its own time "slice" called a "partition" and has its own memory and resources allocated to it. The partitions are controlled by a "master" JVM which always operates in partition 0. In order to prevent one JVM from taking over the system by refusing to relinquish control, each partition has a fixed time length determined by a hardware timer (the partitions do not have to be equal in length. At the end of each partition, a context switch occurs from the partition to the executive.

After the context switch has occurred, the executive performs housekeeping operations, services any interrupts which have occurred and queues the next partition to assume processor control. In order to start the partition, the executive actually starts a "proxy thread" which prepares the application thread which actually runs in the partition for operation by checking for interrupts applicable to the JVM and setting appropriate event flags. The proxy thread then pushes the flags and JVM ID onto the stack and executes a resumeJVM instruction which starts the actual JVM thread for the partition. Special "watchdog" timers enforce the context switches so that software failures or hardware failures within a partition will not prevent the start of another partition.

Figure 12:
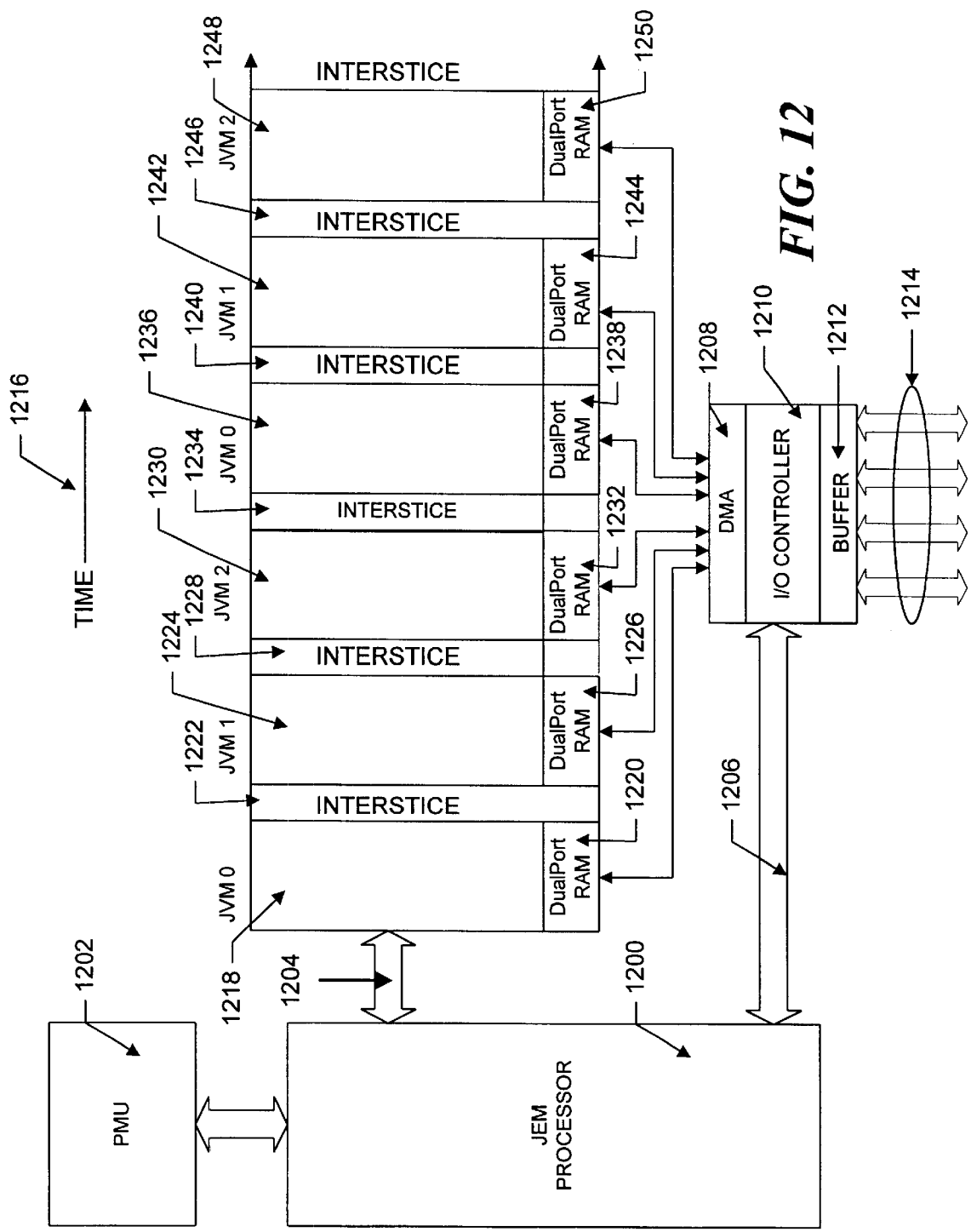
FIG. 12 is a schematic diagram illustrating a time line with three independent JVMs operating within separate partitions.

The scheduling of the partition time "slices" is schematically shown in FIG. 12. The JEM processor 1200 interacts with an IOC controller 1210 to manage input and output information as indicated schematically by arrow 1206. Controller 1210 includes a buffer 1212 for communicating with I/O channels 1214. Also included is a DMA unit 1208 which can communicate with a section of a dual port RAM assigned to each of the partitions 1218, 1224, 1230, 1236, 1242 and 1248. I/O controller 1210 handles all interrupts and shuttles I/O data to a dual port RAM section by means of DMA unit 1208. It is also possible that the dual port RAM units could host interpartition mailboxes.

In FIG. 12, the partitions are arranged on a time line in which time increases in the direction shown by arrow 1216. Each partition is represented by a box 1218, 1224, 1230, 1236, 1242 and 1248 whose width represents the interval of time during which the associated JVM can operate. Although all of the partition widths (and corresponding time intervals) are shown as equal, the time duration of the partitions can be of different lengths, however the time duration of each partition is fixed at system initialization.

In FIG. 12, three JVMs, designated as JVM0, JVM1 and JVM2 operate in a repeating sequence under control of processor 1200 as indicated by arrow 1204. When each partition ends a context switch occurs in order to start the JVM for the next partition. However, the operation of one JVM, for example JVM1 does immediately follow the operation of the preceding JVM. Instead there are time gaps between the partitions. These "gaps" between the partitions are called "interstices" of which interstices 1222, 1228, 1234, 1240 and 1246 are shown. During each interstice time slice, only JVM0 operates and acts to service interrupts and schedule the next JVM for execution. Consequently, two context switches occur at the end of each partition. A first context switch transfers control from the currently operating JVM to JVM0. The second context switch transfers control from JVM0 to the next scheduled JVM.

JVM0 operates as a "master" JVM and as the active machine at hardware reset. It has access to the entire memory space and may execute privileged instructions, such as halt and resume. It is the sole interrupt broker among JVMs.

Figure 17:
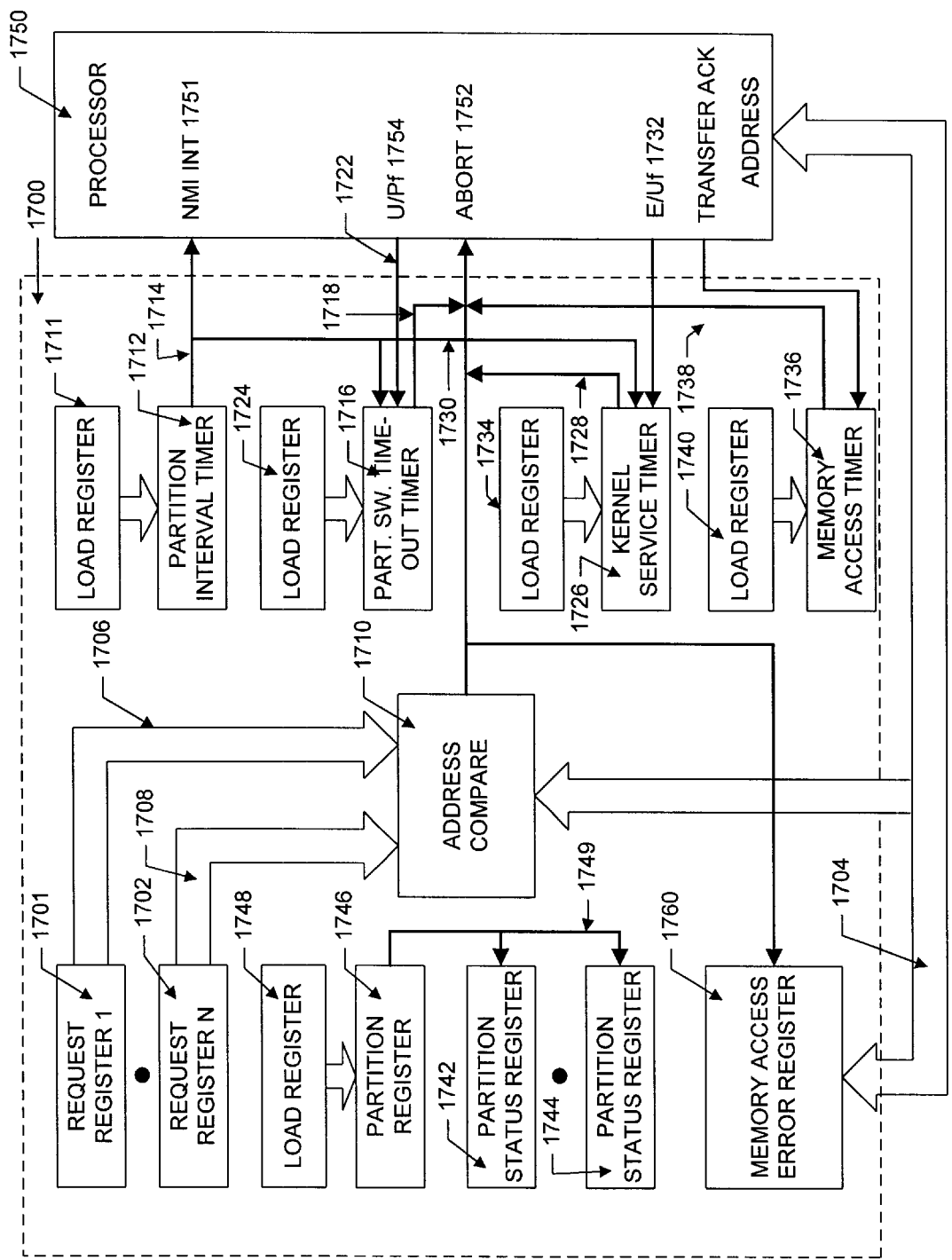
FIG. 17 is a detailed block schematic diagram of a partition management unit.

The partition management unit (PMU) 1202 contains hardware (discussed in connection with FIG. 17, below) which enforces memory isolation between JVMs and forces the appropriate context switches to prevent the system from being "hung" in one state. In order to ensure that time critical PMU functions will be met, some of the PMU functions can be added to the processor core processing. Additional interrupt management features can also be added to existing core interrupt controllers.

Figure 13:
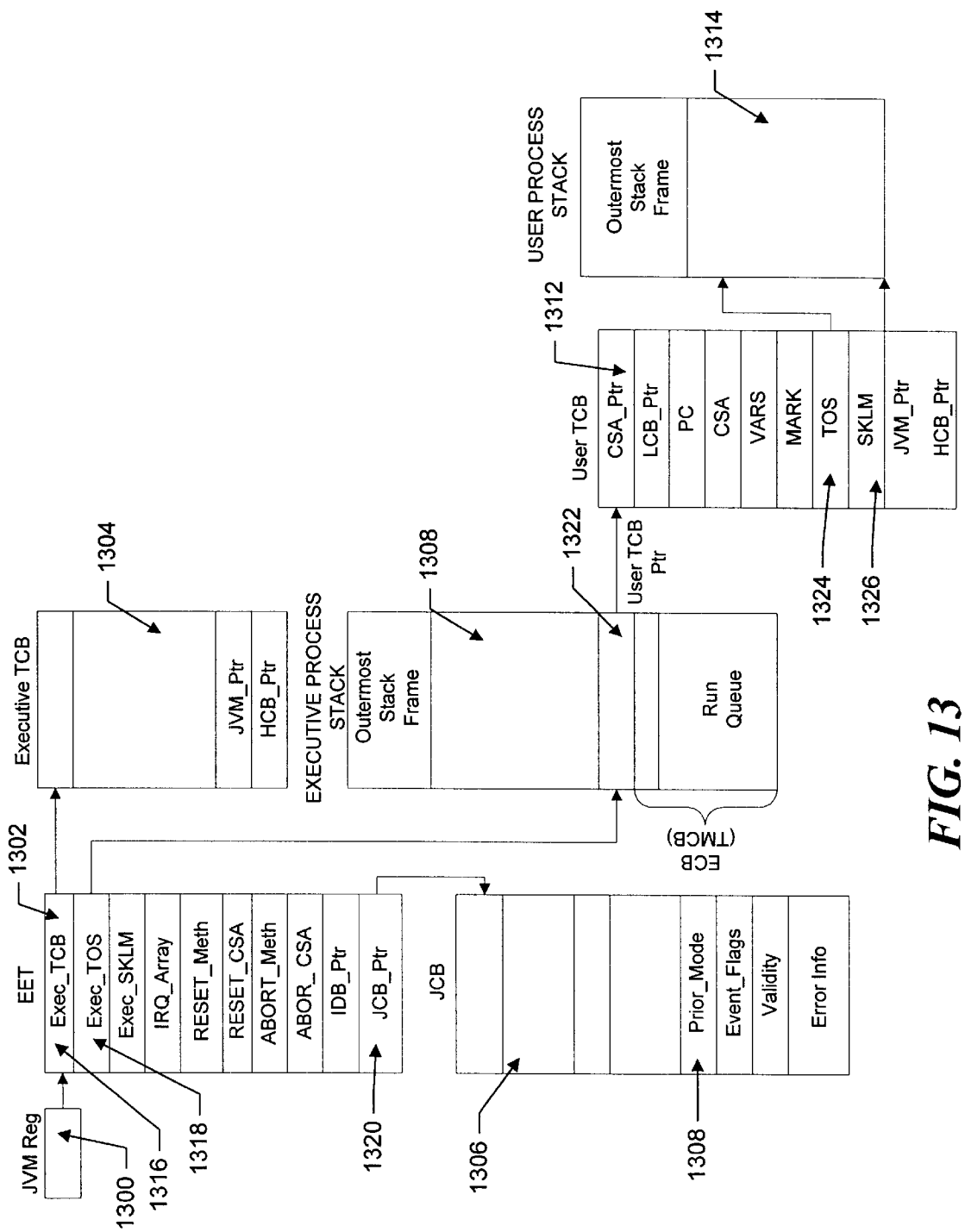
FIG. 13 is a schematic diagram illustrating control structures associated with each JVM and how all of the structures are dependent on a root JVM value contained in a JVM register.

Each JVM is independent from other JVMs. In particular, control structures are replicated for each JVM in order to ensure that there will be no denial of service to any JVM and no attacks by a single JVM on global JVM structures. The control structures associated with each JVM are illustrated in FIG. 13. The collection of data structures necessary to manage a given JVM is called a "logical execution environment" which is further subdivided into "executive mode" and "user mode" logical environments.

The "executive" execution mode is a supervisory mode intended for kernel operating system functions, interrupt handling, and trap handling. Only one executive mode thread of control may be active at a time. For example, if an interrupt occurs, an interrupt handler thread of control is created. This interrupt thread must then complete before executive mode is exited.

The logical JEM executive execution environment consists of the executive entry table (EET) 1302, JVM control block (JCB) 1306, executive thread control block (ETCB) 1304, and an executive control block 1322. Each JVM has its own EET 1302 which serves as the root data structure for a JVM and contains pointers to the other relevant control structures. JVM0, the "master" JVM, has an EET that resides at memory location 0000. The JEM architecture clears the JVM register on reset so that the system always starts at JVM0 during a reset operation.

A JVM register 1300 in the processor register file (204) contains the address of the EET 1302 for the active JVM. Each JVM also has its own set of EET handlers. Each JVM has an executive thread control block 1304 and an executive process stack 1308. The executive control block 1304 is located by a pointer, Exec_TCB 1316 in the EET 1302. The executive stack 1308 is located by the Exec_TOS pointer 1318 in the EET 1302. The EET 1302 also contains pointers to various interrupt, RESET and ABORT handlers. A pointer 1320, JCB_Ptr, to the JVM control block (JCB) 1306 is also included. The JCB includes event flags, validity and error information.

Each JVM also has a thread management control block or executive control block (ECB) 1310 which is used during context switches as described above. The ECB is located in the executive process stack 1308 directly above the User TCB pointer 1322 which is at the Exec_TOS pointer 1318 location in the EET 1302.

The User TCB pointer 1322 points to the User TCB 1312 which is also used during context switches as discussed above. The User TCB contains a pointer 1324 (TOS) which points to the top of the User process stack 1314 and another pointer 1326 (SKLM) which points to the end of the User process stack 1314.

In accordance with the principles of the invention, all of the control structures are located by the value in the JVM register 1300. Therefore, during a context switch, a new set of control structures can be made active simply by changing the value in the JVM register 1300. The same microcode and code sequences can be used for processing in each JVM by referencing the JVM register 1300 to obtain the "root" address for the correct control structures for that JVM.

Figure 14:
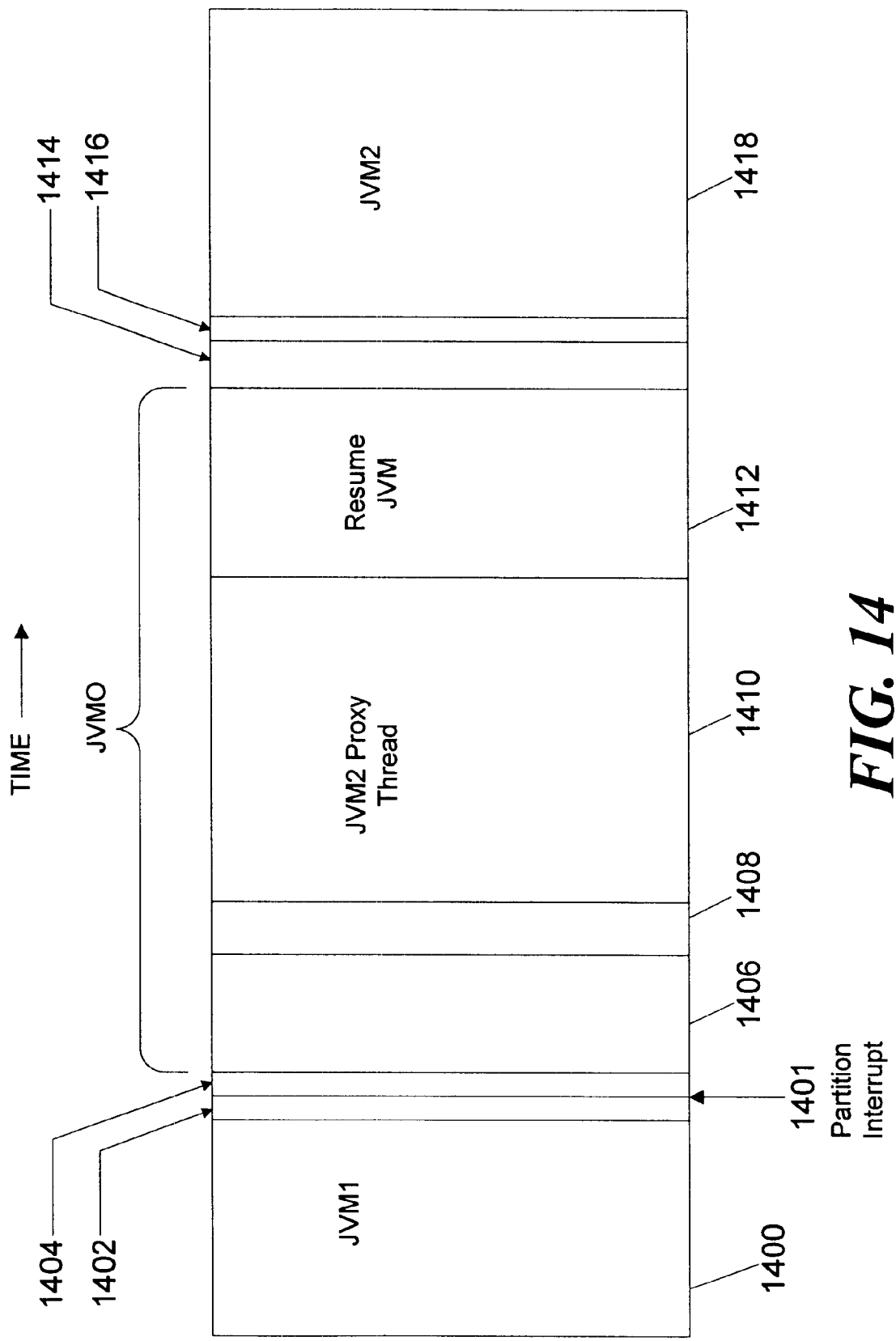
FIG. 14 is a time line indicating the sequence of operations performed during an interstice time period.

Partitions are defined by non-maskable partition interrupts. Each partition interrupt terminates JVM processing in a partition and generates "interstitial" activity. The interstitial activity is shown in detail in FIG. 14 which indicates time slices in a time line in which time increases to the right. FIG. 14 particularly illustrates interstitial processing which occurs after processing stops in JVM 1 and before processing begins in JVM2. During time interval 1400, user activity in JVM1 occurs. This processing is completing at the time immediately before the partition end as shown schematically area 1402.

At time 1401, a partition interrupt, which is a non-maskable interrupt, occurs. The interrupt causes the JEM microcode in the processor to vector to an NMI interrupt handler. More specifically, during time period 1404, the microcode saves the current user or executive state and updates the JVM prior mode field 1328 in JCB 1306 (FIG. 13) since the partition could have been in user or executive mode when the partition interrupt occurred. Next, the microcode sets up the JVM0 executive mode and invokes the JVM0 NMI handler to process the partition interrupt.

During time period 1406, the JVM0 NMI handler processes the interrupt. This processing involves updating the system tick which drives the JVM0 periodic thread mechanism (a piano roll mechanism is used as described below). The JVM0 piano roll selects the ID of the JVM to execute in the next partition. The JVM0 NMI handler also performs "mod" calculations which drive the piano roll mechanism in each of the other JVMs as discussed below. At the end of the JVM0 NMI handler routine, the "outer" procedure return microcode executes in time period 1408. This return microcode causes a dispatch of a "proxy thread" for JVM2.

Each JVM has a "proxy thread" in JVM0 and these proxy threads are scheduled by the piano roll mechanism. JVMs are scheduled according to the schedule established for the proxy threads to maximize flexibility and to allow easy round-robin partition scheduling.

The proxy thread for JVM2 executes in time period 1410 and prepares its associated JVM2 for execution. In particular, the proxy thread checks for events such as interrupts which are applicable to JVM2 for which the proxy thread is responsible. The proxy thread also sets event flags and places a pointer to the location of the JVM2 EET in the JVM register 1300. It also checks the "health" of JVM2 and can issue a JVM reset if a problem occurs. If everything appears to be in proper order, the proxy thread executes a "resumeJVM" instruction.

In time period 1412, the resumeJVM instruction microcode executes in order to prepare the JVM2 microcode. Specifically, the resumeJVM instruction microcode saves the state of the JVM2 proxy thread and switches context to the JVM thread for which it is responsible. The actual JVM context switch setup depends on the "mode" field. the resumeJVM code then pushes event flags for the JVM2 NMI handler onto the stack and fetches the first byte code for the JVM2 thread execution.

Each JVM has an NMI handler which handles interrupts. This NMI handler executes in time interval 1414 and checks event flags, and, depending on the set flags (if any) an appropriate JVM interrupt handler is invoked. This handler uses the IRQ_Array in the corresponding EET 1302. At the end of the JVM2 NMI handler routine, the "outer" procedure return microcode executes in time period 1416. This return microcode causes a dispatch of the JVM2 thread which executes in time period 1418. Execution continues in this manner for each context switch.

Figure 15:
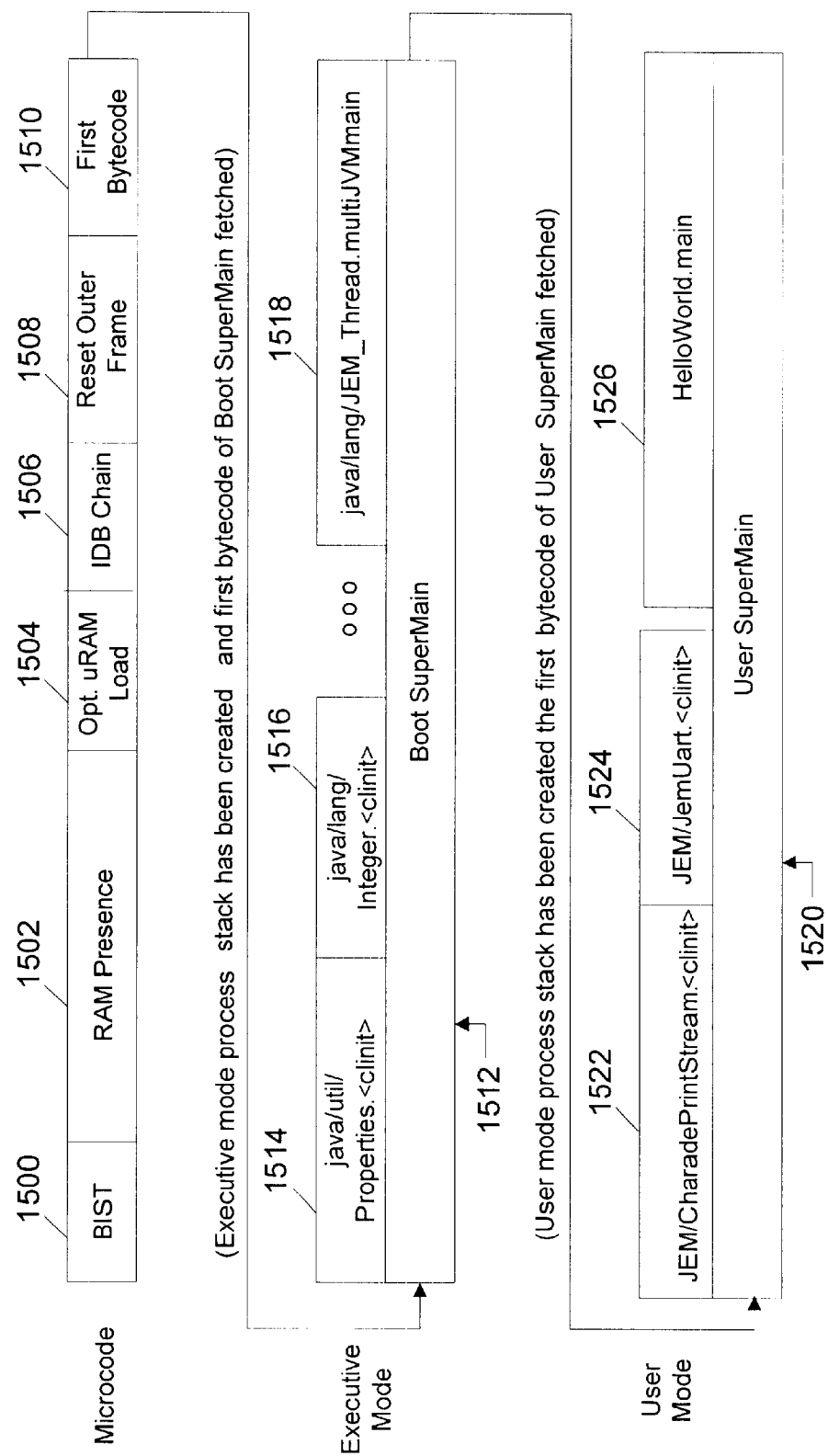
FIG. 15 is a modified flowchart illustrating actions which take place during a system reset or power up.

In order to handle a system reset or power up condition, the JVM register 1300 is cleared by a hardware reset and a reset EET resides at location 00000000. The reset microcode performs the steps shown in FIG. 15. In particular, FIG. 15 shows actions performed first by the reset microcode, and then by JVM0 operating first in executive mode and then in user mode. As indicated in FIG. 15, the power up and reset routine starts with a boot internal self test (BIST) step 1500 which performs a test of various components and consistency checks. Next, in step 1502, the microcode checks for the existence of a program RAM. Next, in step 1504, an optional microcode RAM is loaded if a writable control store is being used.

In step 1506, an initialized data block (IDB) chain is traversed. Then, in step 1508, the outer frame for the reset vector is set up. Finally, in step 1510, the first byte code for the JVM0 SuperMain method is fetched and executed. Step 1510 completes the microcode initialization. At this point, the executive mode process stack has been created and the first byte code of the boot SuperMain program has been fetched.

The processor next enters executive mode and proceeds to JAVA initialization. When the SuperMain program is executed, it loads and initializes the JAVA shared classes and executes the executive mode "main" program. In particular, the SuperMain program 1512, loads the JAVA shared classes, such as java/util/Properties.<clinit> class 1514, the java/lang/integer.<clinit> class 1516 and other JAVA shared classes. Finally, the executive main program java/lang/JEM_Thread.multiJVMmainprogram 1518 is executed. The SuperMain program 1512 also initializes the PMU 1202 (FIG. 12) and initializes the I/O controller 1210. At this point, the user mode process stack has been created and the first byte code of the user SuperMain program fetched.

The processor then enters user mode and executes the user SuperMain program 1510. The user SuperMain program 1510 loads and initializes additional JVM classes and finally executes the application main procedure. It also creates proxy threads and creates the application threads necessary to operate the application. In particular, the user supermain program 1510 loads the JEM/CharadePrintStream.<clinit> class1522, the JEM/JemUart.<clinit> class 1524 and other utility classes. Finally, the SuperMain program 1510 fetches the application main program 1526. It completes the power up initialization and begins execution of the user application program.

Figure 16:
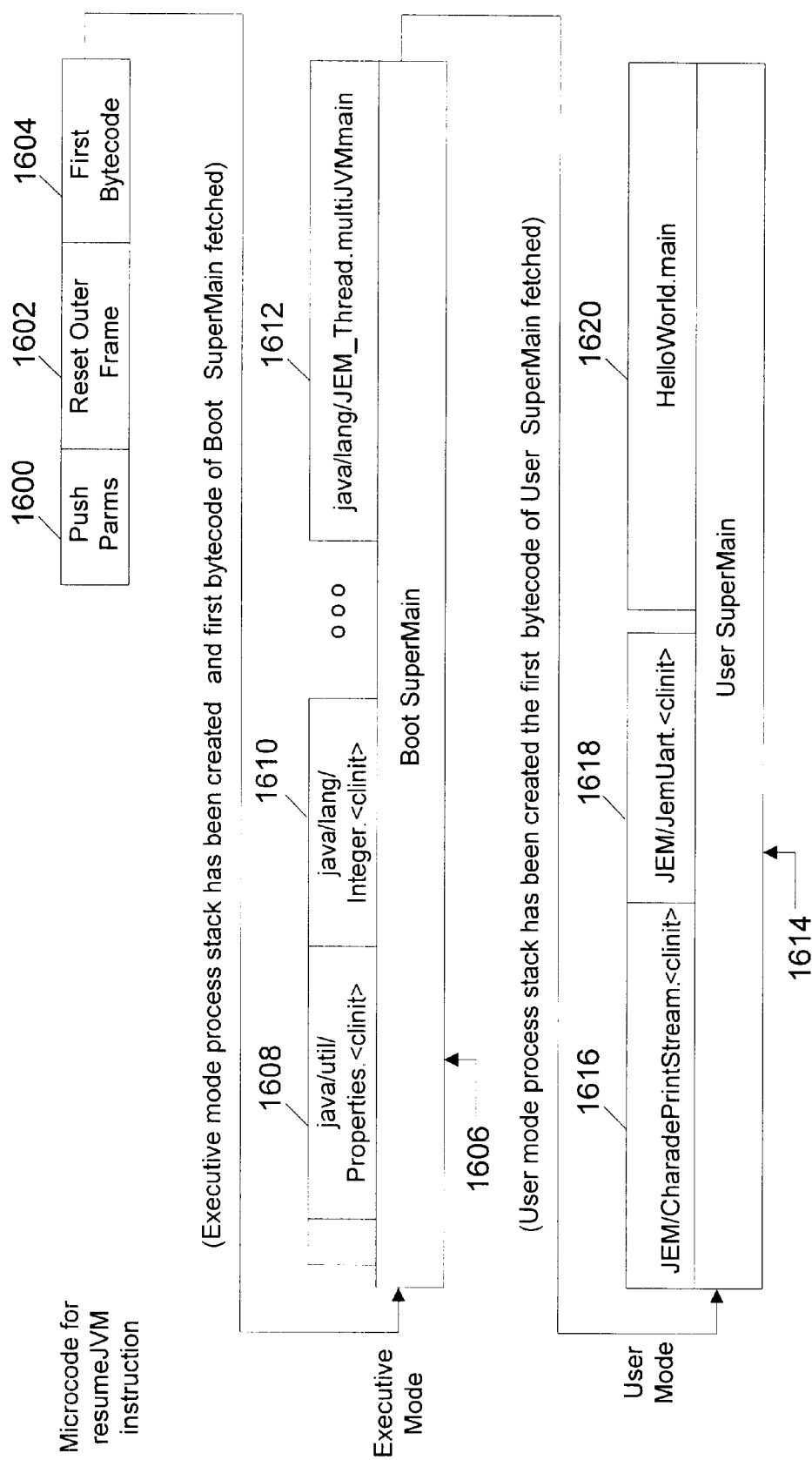
FIG. 16 is a modified flowchart illustrating actions which take place during a JVM reset (other than JVM0).

Each JVM (other than JVM0) also has a reset vector which provides for initialization of the JVM. FIG. 16 illustrates the steps in initializing a JVM other than JVM0. As shown in FIG. 16, the microcode which implements the "resumeJVM" instruction pushes parameters into the stack as indicated in step 1600 and resets the outer frame of the resumeJVM instruction as indicated in step 1602. The initialization routine then executes the first bytecode of the executive boot SuperMain program as indicated in step 1604. At this point, the executive mode process stack has been created and the first bytecode of the boot SuperMain program fetched.

The JVM then enters executive mode and executes the boot SuperMain program. The boot SuperMain program 1606 loads and initializes various JAVA shared classes including java/util/Properties.<clinit> class (step 1608), the java/lang/Integer.<clinit> class (step 1610) and other shared JAVA classes. Finally, the first bytecode for the java/lang/JEM_Thread.multiJVMmain program is loaded in step 1612 and executed. At this point, the user mode process stack has been created and the first byte code of the user SuperMain program fetched.

The user mode SuperMain program 1614 then executes. It loads some additional JAVA utility classes in steps 1616 and 1618 and finally executes the main program of the application in step 1620.

As previously mentioned, the PMU enforces memory protection constraints and contains the watchdog timers that enforce the context switches that change the partitions. The PMU contains several address checking registers that must be memory mapped to allow software programmability. Access to these registers is only allowed during JVM0 operation during the "unprotected" mode.

The PMU receives several inputs which reflect the processor state so that the PMU can ascertain whether the system in operating in "protected" or "unprotected" mode and whether the current partition is operating executive or user mode. In particular, the PMU receives the current processor state from the processing element by two lines: the U/Pf and E/Uf lines, which stand for the Unprotected/Protected line and the Executive/User line, respectively. The state of the U/Pf line will indicate if the current access is being initiated by JVM0 (U/Pf=1) or another JVM (U/Pf=0). The state of the E/Uf line indicates if the current partition is operating in Executive mode (E/Uf=1) or User mode (E/Uf=0).

The PMU also receives Address, Data and handshake signals on the address, data and control busses, respectively. A separate processor clock input is also provided. A PMU enabled/disabled pin is provided to allow disabling the PMU in the event it is nonfunctional or an external PMU is used.

Memory protection is enforced by the PMU by inhibiting memory leaks from one JVM to another. Each JVM is allowed to access only specific areas of memory which is enforced by address compare hardware in the PMU that checks the address of each bus transfer against an allowed address memory map. Hence, physical memory address space needs to be allocated for each JVM in the system. Illustratively, JVM0 is allocated a first physical address range (starting at 00000000) for its runtime data structures. In a preferred embodiment, virtual memory addressing (i.e. memory translation) is not supported to minimize risk and debugging efforts.

The PMU must also monitor bus transfers to insure that data is not improperly read or written at address outside the allowed address ranges. There are three types of bus transfers: data read, data write, and code fetch. The PMU address compare logic will check for read/fetch or write. Thus, data read and code fetch are considered the same by the PMU. Whether address monitoring is actually enabled depends on the processor state. Since the master JVM (JVM0) must have access to all memory, memory checking is not performed during the JVM0 time partition.

Accordingly, when the system is operating in unprotected mode (U/Pf line state=1), JVM0 will have access to all memory (including PMU registers) and address checking is disabled in the PMU. In protected mode (U/Pf line state=0), the address compare hardware will be enabled for all bus transfers. Any memory violations in protected mode are recorded in the current partition status register and the memory access violation signal is generated. The memory access violation signal can be connected to an ABORT line or to a maskable interrupt input of the processing element as configured at initialization time.

When the system is operating in protected mode (U/Pf line state=0), if a transfer is to an allowed location, then the transfer is allowed to complete. If a transfer is to a location outside the allowed area, then the transfer is inhibited. That is, read data is intercepted and zeroed before being presented to the processing element. Similarly data write operations must be inhibited or the overwritten data must be restored to its prior value in order to insure there is no interference between JVMs.

Several sets of address range comparators will be provided. Each set will have a requirements register (REQ_REG) containing a lower bound 30-bit word address (inclusive), an upper bound 30-bit word address (inclusive), a write enable bit and a user enable bit (read and executive have no enable bits and are allowed for each range.)

One of two approaches is allowed for address compare logic setup. In accordance with one embodiment, each address range compare may have only one requirements register. In this case, JVM0 software must set each address compare request register each time a non-zero JVM is to be activated. In accordance with another embodiment, each address range compare may have request registers for each non-zero JVM in the system. In this case, all request registers are set up at initialization time.

The PMU also contains watchdog timers which enforce context switches between the various partitions. The timers are self-activated timers to ensure partition scheduling is performed and the processor is kept running in the event of a software error. Each timer can be either enabled or disabled and hardware signals from the processor are used to deactivate watchdog timers within configurable time-out limits.

The partition interval timer 1712 is used to signal the completion of a partition time slice and return to JVM0 operation, which, as previously mentioned, checks for system events and schedules the next partition. The timer alarm signal is connected to the NonMaskable Interrupt (NMI) input 1714 of the processing element 1750 as configured at initialization time.

In order to provide deterministic time partitioning, timer 1712 must operate for the exact time interval and reset for the next time interval without losing any timer ticks. Hence, timer 1712 must run continuously and have the next time interval ready to be loaded when the timer alarm 1714 is signaled. Therefore, timer 1712 is only loaded via a load register 1714 which specifies the time interval for the next partition time slice. Load register 1714 specifies the time interval in fixed units, such as CPU clock ticks. Setting the load register 1714 does not modify or suspend timer operation. When the time interval has elapsed, an alarm signal is generated on output 1714 and the timer 1712 is reset with a value stored in load register 1714. The partition interval timer 1712 is enabled when the load register 1714 is loaded with a nonzero time interval value and the timer 1712 is disabled by clearing the load register 1714.

Figure 18A:
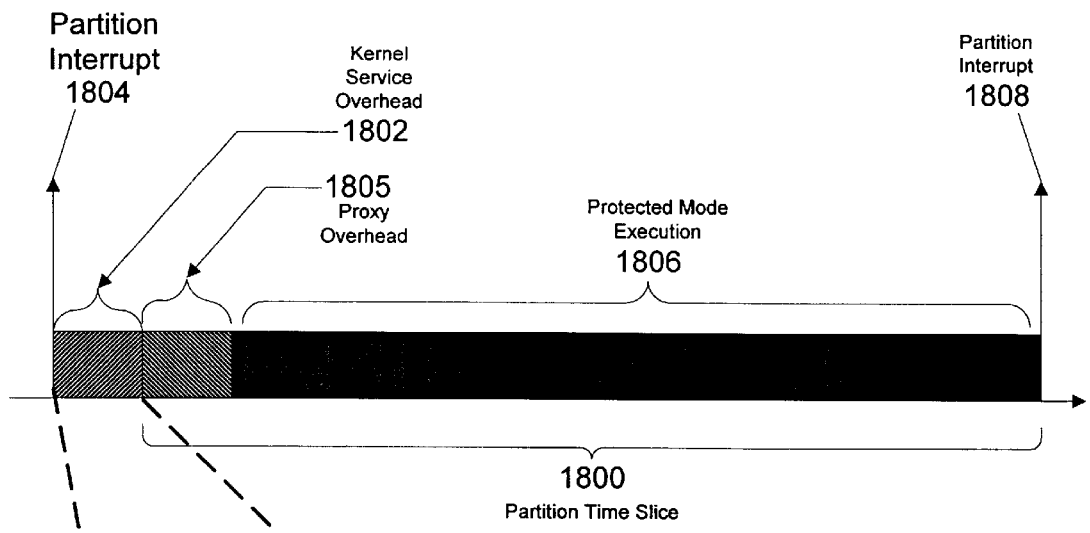
FIG. 18A is a time line showing actions which take place during the processing of a partition and illustrating how the actions are divided between kernel services, proxy thread actions and JVM operation.
Figure 18B:
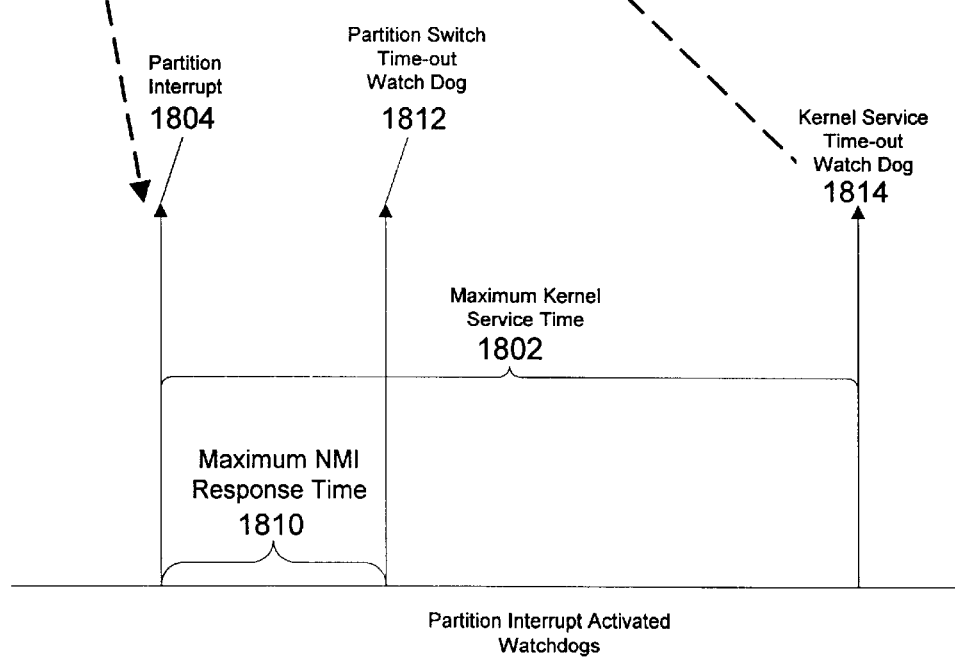
FIG. 18B is a time line of actions which take place during the kernel service overhead time showing how the time for performing each action is limited by hardware timers.

FIGS. 18A and 18B illustrate the various timeout signals which will be periodically generated during a normal partition time slice. The partition interval timer generates the partition interrupts 1804 (illustrated in FIG. 18A and 18B) and 1808 (FIG. 18A.) After each partition interrupt 1804, there is a kernel service overhead time period 1802. This kernel service overhead time period 1802 is illustrated in more detail in FIG. 18B. It is followed by a partition time period 1800 during which the partition specific threads run. The partition time slice 1800 includes a proxy thread overhead time period 1805 during which a proxy thread runs as described above and a protected mode execution time period during which the JVM thread (other than JVM0) runs.

A partition switch time-out watchdog timer 1716 is used to unconditionally terminate partition execution when the partition interval timer interrupt (1804) is not acknowledged by the processing element 1750. This abnormal condition could be the result of a non-terminating instruction or an endless microcode loop. The timer alarm signal 1718 can be connected to the ABORT input 1752 of the processing element 1750 as configured at initialization time. The partition switch time-out watchdog timer 1718 is activated by the alarm signal from the partition interval timer1712 as indicated by arrow 1720. Once activated, the timer 1716 runs until either it is canceled via a transition to unprotected mode (U/Pf line state becomes 1) or the time-out interval has elapsed.

While the timer is running, the PMU 1700 monitors the unprotected/protected line 1754 as indicated by arrow 1722 to determine if the processing element 1750 has acknowledged the partition interval timer interrupt (1804) and begun a transition to JVM0 operation. If the transition to unprotected mode (U/Pf line state=1) is detected before the time-out interval of timer 1716 has elapsed, the timer 1716 is deactivated and execution proceeds in a normal fashion. Otherwise, when the time-out interval has elapsed, the partition switch time-out watchdog timer alarm 1812 is generated and the timer 1716 is deactivated. In addition, the partition switch time-out event 1812 is recorded in the current partition status register 1742.

A load register 1724 for the partition switch time-out watchdog timer 1716 specifies the time interval in fixed units, such as CPU clock ticks. Setting the load register 1724 does not modify or suspend timer operation. When the timer 1716 is activated, the timer 1716 is set with a value in load register 1724 and begins running. The partition switch time-out watchdog timer 1716 is enabled when the load register 1724 is loaded with a nonzero time-out interval value. The watchdog timer 1716 is disabled by clearing the load register 1724.

Another watchdog timer, called the kernel service timeout watchdog timer 1726 is used to unconditionally terminate the partition interval timer interrupt handler when a partition proxy thread fails to be activated. This watchdog timer 1726 provides bounded execution of kernel services and guarantees partition time slice allocation. The timer alarm signal 1728 is also connected to the ABORT or RESET input 1752 of the processing element 1750 as configured at initialization time. The kernel service time-out watchdog timer 1726 is activated by the alarm signal from the partition interval timer 1712 as indicated by arrow 1730. Once activated, the timer 1726 runs until either it is canceled via the transition to user mode (E/Uf line state=0 as indicated by arrow 1732), or its time-out interval has elapsed.

While the timer 1726 is running, the PMU 1700 monitors the E/U line 1754 to determine if the processing element 1750 has completed the partition interval timer interrupt (NMI) processing and transitioned to partition proxy thread. If the transition to user mode (E/Uf line state=0) is detected before the time-out interval has elapsed, the timer is deactivated and processing proceeds in the normal fashion. Otherwise, when the time-out interval has elapsed, the kernel service time-out watchdog timer alarm (1814) is generated and the timer 1726 is deactivated. In addition, the kernel service time-out event 1814 is recorded in the current partition status register 1742 (for partition 0).

A load register 1734 is provided for the kernel service time-out watchdog timer 1726 which specifies the time interval in fixed units, such as CPU clock ticks. Setting the load register 1734 does not modify or suspend timer operation. When the timer 1726 is activated, the timer 1726 is set with load register value and begins running. The kernel service time-out watchdog timer 1726 is enabled when the load register 1734 is loaded with a nonzero time-out interval. The watchdog timer 1726 is disabled by clearing the load register 1734.

A memory access time-out watchdog timer 1736 is used to unconditionally complete an unterminated memory transaction. This watchdog guarantees all memory transactions are completed within a maximum response time and the processor clock is never suspended indefinitely. the timer alarm signal 1738 is connected to the ABORT input 1752 of the processing element 1750 as configured at initialization time.

The memory access time-out watchdog timer 1736 is activated by the start of a memory transaction. Once activated, the timer runs until either it is canceled, via a transfer acknowledge indicating that the memory transaction is complete, or its time-out interval has elapsed. While the timer is running, the PMU 1700 monitors the transfer acknowledge line 1756 to determine if the memory controller (not shown in FIG. 17) has responded to the transfer request. If a transfer acknowledge is detected before the time-out interval has elapsed, the timer 1736 is deactivated and processing continues in the normal fashion. Otherwise, when the time-out interval has elapsed, the memory access time-out watchdog timer alarm 1738 is generated, a transfer acknowledge is signaled to the processing element 1750 and the timer 1736 is deactivated. In addition, the memory access time-out event is recorded in the current partition status register 1742 and all data lines are zeroed in the event a read transaction was unterminated.

A load register 1740 is provided for the memory access time-out watchdog timer 1736 and specifies the time interval in fixed units, such as CPU clock ticks. Setting the load register 1740 does not modify or suspend timer operation. When the timer 1736 is activated, the timer 1736 is set with load register value and begins running. The memory access time-out watchdog timer 1736 is enabled when the load register 1740 is loaded with a nonzero time-out interval. The watchdog timer 1736 is disabled by clearing the load register 1738.

The PMU 1700 also maintains the status of each partition to identify any faults or time-outs that have occurred. The partition scheduling software is responsible for setting up for the next partition to activate including verifying the health of the partition before activation. The active partition ID is maintained by a single partition register 1746. An update to the partition register 1746 constitutes a partition switch. In protected mode (U/Pf line state=1), the partition register 1746 identifies the active partition. In unprotected mode (U/Pf line state=0), the partition register 1746 is zero to designate JVM0 operation. Note that the partition register 1746 can only toggle between zero and a non-zero partition ID.

A load register 1748 is provided for the partition register 1746 and specifies the next partition to be activated. Setting the load register 1748 does not immediately modify the partition register 1746. The partition register 1746 is set with load register value during the transition from unprotected to protected mode.

A partition is activated when the partition register 1746 is loaded with a non-zero partition ID. During JVM0 operation (unprotected mode), the partition load register 1748 is set with the next partition to be activated. The partition register 1746 is set during the activation of a partition (specifically, during processing of the resumeJVM instruction) via the protected mode signal (U/Pf line state=0) from the processor 1750. Proper setup of a partition activation sequence requires that the partition ID (partition load register value) is consistent with partition's JVM pointer (argument to resumeJVM instruction). Setting the partition load register 1746 to zero is allowed but meaningless since the processor 1750 remains in JVM0 operation (unprotected mode).

A partition is deactivated when the partition register 1746 is cleared. In protected mode, the partition register 1746 is cleared during the response to the partition switch interrupt via the protected mode signal from the processor (U/Pf line state=1). The partition register 1746 is also cleared upon reset since JVM0 is in effect.

A set of partition status registers 1742–1744 is defined for each partition. At a minimum, the register sets must consist of a bit mapped event register and a memory access error address register. The register sets 1742–1744 can either be cleared upon reset or cleared by the initialization software. The event bits in registers 1742–1744 are set by watchdog timer time-outs or memory access violations as previously described. The partition register 1746 identifies which of partition status registers 1742–1744 records the event.

A memory access error address register 1760 stores the address at which the first memory access violation occurs.

As previously described, the timer alarms and memory access violation signals are connected to the processor interrupt and ABORT inputs, 1751 and 1752, respectively.) The CPU ABORT processing proceeds as follows:

1. In Protected mode in user mode, the current instruction is terminated, the current thread is suspended and the partition ABORT handler is invoked.
2. In Protected mode and executive mode, the current instruction is terminated, the JCB validity flag is set with error code or a pointer to error data, the executive state is saved and the ABORT microcode loops, waiting for a partition interrupt.
3. In Unprotected mode and user mode, the current instruction is terminated, the current thread is suspended and the JVM0 ABORT handler is invoked.
4. In Unprotected mode and executive mode, the current instruction is terminated, the JCB validity flag is set with an error code or a pointer to error data, the executive state is saved and the ABORT microcode loops, waiting for a reset interrupt.

Periodic threads are scheduled with a piano roll mechanism which is implemented by means of the ready queue. As previously mentioned, the ready queue is managed by means of a bit mask (1152, FIG. 11B) which determines the priority queues that are enabled. A second mask is ORed with the bit mask in order to set several bits in the bit mask and enable several queues in parallel. Therefore, the second mask defines the "chord" of the piano roll.

Periodic processing is performed as part of an endless loop. When periodic processing is complete, a call to a runtime method blocks a thread by clearing its bit in the ready queue mask 1108. Once removed from the ready queue, the periodic thread remains blocked until the bit mask 1108 is ORed with the chord to once again set the thread's ready queue bit in the bit mask 1108 and prepare the chord for "playing." This logical OR operation is performed as part of a periodic tick interrupt handler.

Figure 19:
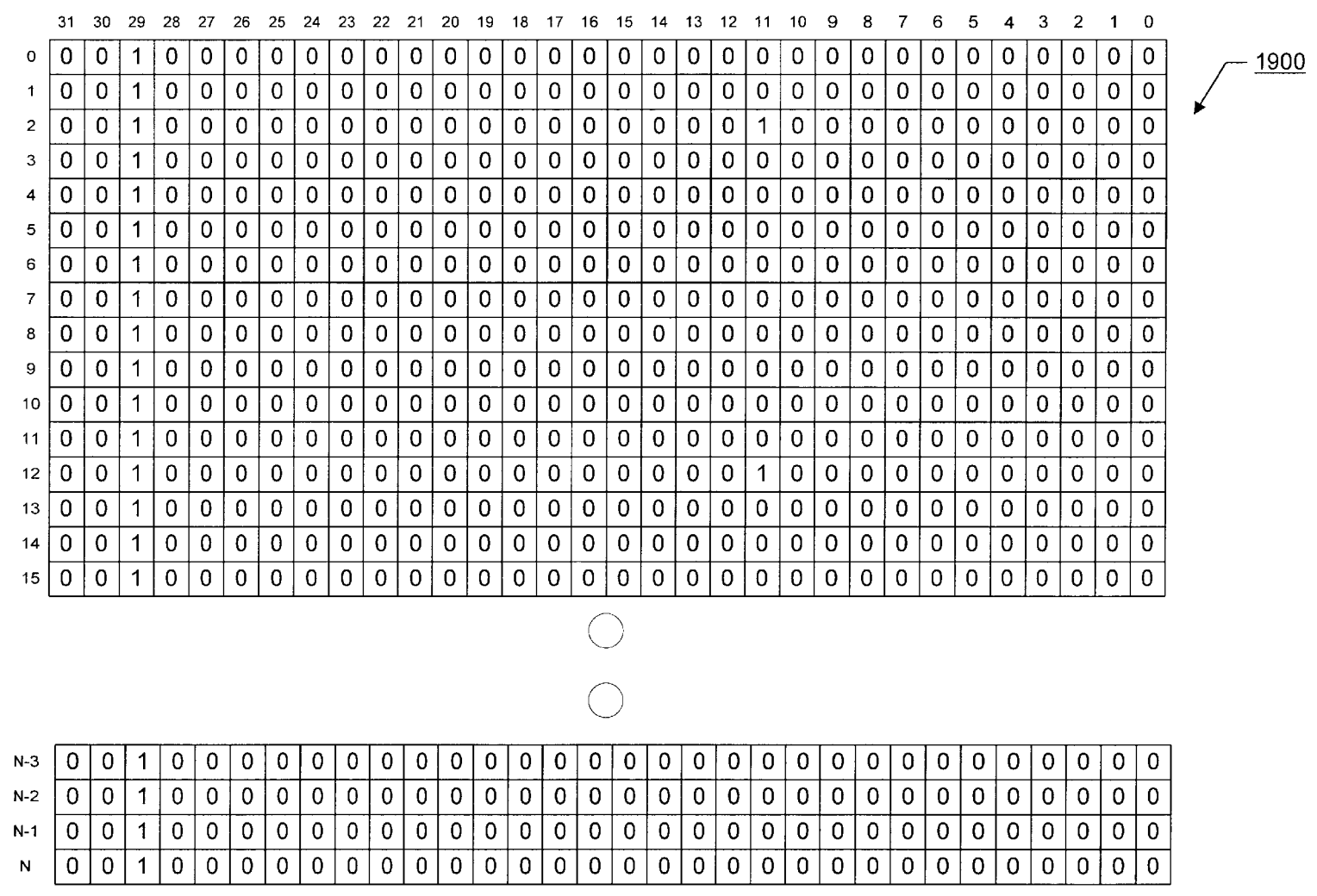

A simple OR operation with a fixed chord mask would activate each periodic thread at the same rate each time a piano roll was played. In order to accommodate thread activation at varying rates, an array of chords is created and the periodic tick interrupt handler reads the masks from the array in a round-robin fashion in order to create a time-varying chord mask. Such a chord array is shown in FIG. 19. Each row in the array represents a chord used during the piano roll sequence. As shown in FIG. 19, there are N+1 chords in the array 1900 represented by N+1 rows (0–N). Each row contains a bit for each priority level indicating whether the associated priority level will be active during the piano roll. For example priority level 29 is active when every chord is played during the piano roll, while priority level 11 is active only on chords 2, 12, etc. The tick frequency which drives the piano roll is chosen based on the highest rate periodic thread; e.g., a 20 Hz thread needs a 10 Hz tick. However, if the slowest rate periodic thread frequency is not evenly divisible into all other periodic thread frequencies, the tick frequency will have to be greater than the highest rate thread, which results in a throughput penalty. (Unless, of course, there is some other activity that has to be done at this higher tick rate.) For this reason, periodic thread frequencies are typically chose as multiples of one another. It is similarly advantageous to have the delay resolution be equal to the period of the highest rate periodic thread.

The piano roll is implemented by three fields in the ECB: the PRIndex (1112, FIG. 11), the LastChord field 1114, and the FirstChord field 1116. These three fields are all byte addresses of piano roll chords which can be located in memory. The fields are positioned in the ECB according to the order in which they are read. When a tick occurs, the chord indicated by the PRIndex field 1112 is ORed with RqMask field 1108 to activate the priority levels associated with set bits in the chord. The PRIndex field 1112 is then compared to the LastChord field 1114. If the fields are equal the PRIndex field 1112 is reset to the value of the FirstChord field 1116. Otherwise, the PRIndex field 1112 is advanced to the next chord. As previously mentioned, only JEM priority levels 3, 5, 7, 9, 11, 13, 15, 17, 19, and 21 are used for periodic threads, so other bits in the chords are always set to zero.

Also, as mentioned, a periodic priority queue may be empty when a chord mask containing a bit which would activate the queue is "played". Since activation of an empty periodic level must be prevented, the PrMask field 1110 is used to clear the chord bits of empty levels before the chord is ORed with RqMask 1108. The PrMask field 1110 has a bit for each priority level. A PrMask bit is set when a thread is added to an associated empty priority level and cleared when the last thread is removed from the corresponding priority level. When there are no activated periodic priority queues the PrMask field 1110 is equal to the RqMask field 1108. When there are one or more periodic priority queues, the PrMask field 1110 normally differs from the RqMask field 1108 only at the periodic priority levels that have completed their cyclic processing and are awaiting their next activation via the piano roll. The bits in the RqMask field 1108 are set by ORing the RqMask field 1108 with the result of ANDing the chord mask with the value in the PrMask field.

However, before setting bits in the RqMask 1108, a check is made to see if bits to be set are already set in RqMask 1108. Set bits mean that one or more threads at the corresponding priority levels are still present in the ready queue from a prior activation. In other words, the threads in question have not completed their periodic processing loops. If so, a cycle "slip" has occurred and the cycle slip mask, CsMask 1118, is updated. The CsMask field 1118 indicates that the threads at a given priority level have slipped at least once. The CsMask field 1118 allows cycle slips to be monitored in real-time to ensure that a system is running as expected. In order to detect cycle slip, the current piano roll chord is simply ANDed with RqMask 1108 before being ORed with RqMask 1108.

The PrMask field 1110 complicates cycle slip detection. If a periodic priority level is empty when its tick occurs, it has slipped. However, since the RqMask bit won't be set, ANDing the chord with RqMask won't detect cycle slip that is due to periodic thread blockage. Instead, the chord must be XORed with the PrMask field 1110 to see which levels are marked as empty. This result must then be ORed with the "chord AND RqMask" result. The CsMask field 1118 value is then calculated by ORing the CsMask value with the AND of the chord and RqMask value and ORing the result with the chord and XOR of the PrMask value.

Figure 20:
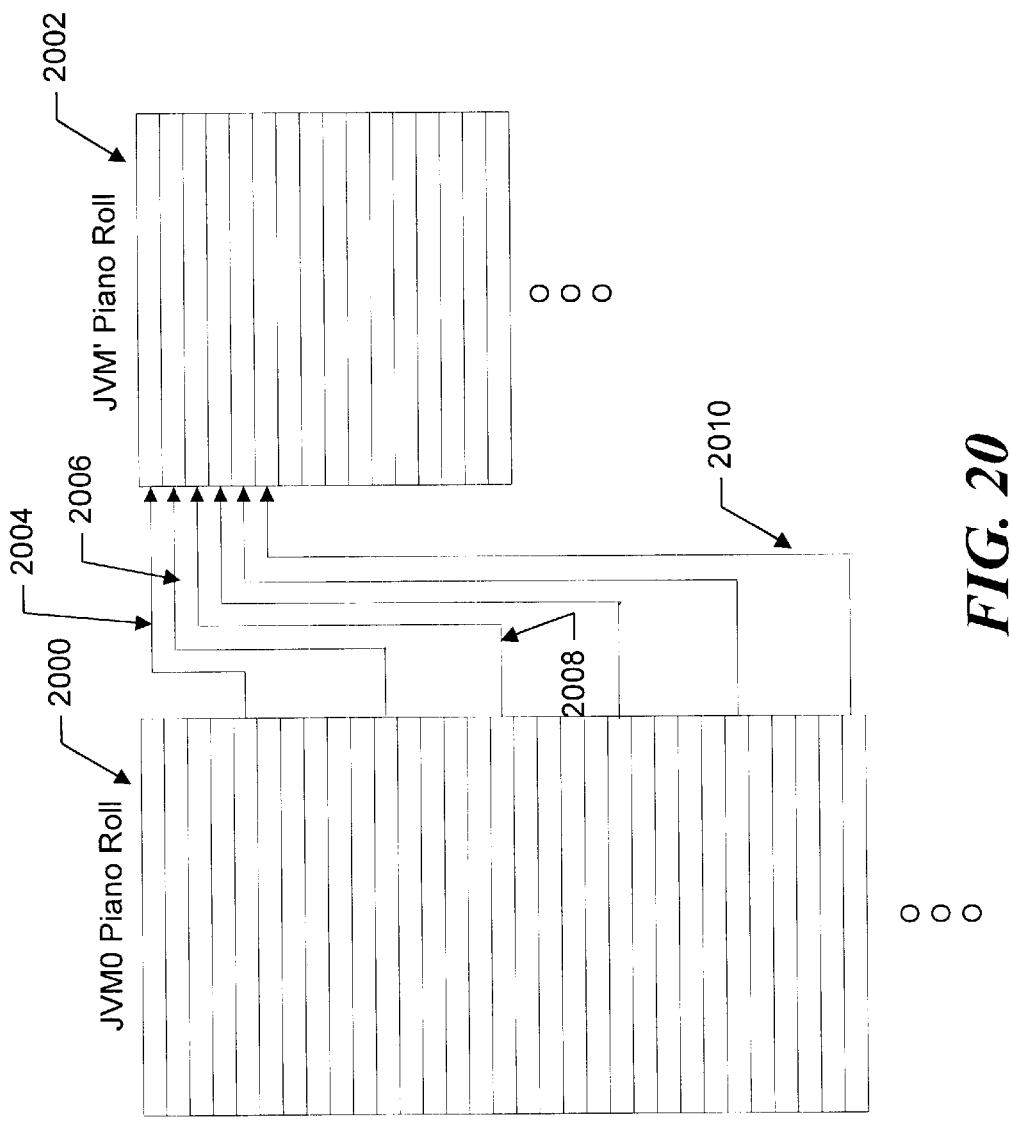
FIG. 20 illustrates an embodiment of a multiple JVM system in which piano roll sequences for each JVM (other than JVM0) are driven by a "mod" signal from JVM0.

FIG. 20 illustrates an illustrative embodiment in which each JVM has its own piano roll sequence. In order to avoid having to use a separate interrupt to drive each JVM piano roll, the piano roll sequence in JVM0 is used to generate an activation signal which is sent to each JVM. The JVM0 piano roll is represented by chord mask array 2000 which is similar to that array illustrated, for example, in FIG. 19. This array is arranged so that every fifth chord generates an activation signal that causes a chord to be played in the piano roll of another JVM. For example chord 5 in the JVM0 piano roll 2000 causes a signal to be generated (as indicated by arrow 2004) which "plays" the first chord in piano roll 2002 for JVM' (any other JVM except JVM0.) Similarly, chord 10 in the JVM0 piano roll 2000 causes a signal to be generated (as indicated by arrow 2006) which "plays" the second chord in piano roll 2002 for JVM'. Subsequent chords in the JVM0 piano roll play the next chord in the piano roll 2002 as indicated by arrows 2008 and 2010. Operation continues in this "modulo" fashion throughout the JVM0 piano roll. The "modulo" values used to trigger each JVM' piano roll can be made different for each different JVM' by recalculating the "modulo" value during the processing for each JVM0 chord.

The inventions described in this disclosure represent significant improvements to the art of computer system design for application to real time embedded systems. The described inventions have particular application to the implementation of a system that is designed and programmed in a high level object oriented language such as the Java programming language.

The description above should not be construed as limiting the scope of the invention, but as merely providing an illustration to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. Apparatus for concurrently running a plurality of JAVA virtual machines (JVMs) on a single processor having a memory, the apparatus comprising:

an initiation mechanism which creates in the memory, data and control structures for each of the plurality of JVMs, the initiation mechanism designating one of the plurality of JVMs as a master JVM;

a first timer which periodically forces a context switch from a JVM which is operating to the master JVM whereupon the master JVM services system interrupts and performs housekeeping duties; and a second timer operational after a predetermined interval of time which causes the master JVM to perform a context switch to the next JVM to become operational.

2. The apparatus according to claim 1 wherein the second timer activates a proxy thread after the predetermined interval of time, which proxy thread handles JVM-specific interrupts, checks the status of the next JVM and starts the next JVM.

3. The apparatus according to claim 1 wherein the data and control structures for each of the plurality of JVMs are referenced by a single table and wherein context switches are performed by changing references from a first table associated with one JVM to a second table associated with a second JVM.

4. The apparatus according to claim 1 wherein access to data and control structures is limited for each JVM to the data and control structures created for the each JVM by the initiation means and wherein the data and control structure access is checked by comparing an address used to access the data and control structure to predetermined limits.

5. The apparatus according to claim 4 wherein the master JVM has access to all data and control structures.

6. The apparatus according to claim 1 wherein the first timer is a hardware driven timer.

7. The apparatus according to claim 1 wherein the second timer is a hardware driven timer.

8. The apparatus according to claim 1 wherein the processor is a JAVA direct execution processor.

9. The apparatus according to claim 1 wherein the data and control structures include a control block which stores the status of a JVM during a context switch.

10. The apparatus according to claim 1 wherein the processor is controlled by microcode and wherein the same microcode is used to execute JVM.

11. A method for concurrently running a plurality of JAVA virtual machines (JVMs) on a single processor having a memory, the method comprising the steps of:

(a) creating in the memory, data and control structures for each of the plurality of JVMs;

(b) designating one of the plurality of JVMs as a master JVM;

(c) using a first timer to periodically force a context switch from a JVM which is operating to the master JVM whereupon the master JVM services system interrupts and performs housekeeping duties; and (d) using a second timer to determine when a predetermined interval of time has elapsed and, at the expiration of the predetermined time period to cause the master JVM to perform a context switch to the next JVM to become operational.

12. The method according to claim 11 wherein step (d) comprises the steps of:

(d1) activating a proxy thread after the predetermined interval of time has elapsed;

(d2) using the proxy thread to handle JVM-specific interrupts, check the status of the next JVM and start the next JVM.

13. The method according to claim 11 wherein the data and control structures for each of the plurality of JVMs are referenced by a single table and wherein step (c) comprises the step of:

(c1) causing a context switch by changing references from a first table associated with one JVM to a second table associated with a second JVM.

14. The method according to claim 11 further comprising the step of:
  (e) limiting access wherein access to data and control structures for each JVM to the data and control structures created for the each JVM by comparing an address used to access the data and control structure to predetermined limits.

15. The method according to claim 14 wherein step (e) comprises the step of:
  (e1) allowing the master JVM to access all data and control structures.

16. The method according to claim 11 wherein the first timer is a hardware driven timer.

17. The method according to claim 11 wherein the second timer is a hardware driven timer.

18. The method according to claim 11 wherein the processor is a JAVA direct execution processor.

19. The method according to claim 11 wherein the data and control structures include a control block which stores the status of a JVM during a context switch.

20. The method according to claim 11 wherein the processor is controlled by microcode and wherein the same microcode is used to execute each of the plurality of JVMs.

21. A computer program product for concurrently running a plurality of JAVA virtual machines (JVMs) on a single processor having a memory, the computer program product comprising a computer usable medium having computer readable program code thereon, including:
  program code which creates in the memory, data and control structures for each of the plurality of JVMs;
  program code which designates one of the plurality of JVMs as a master JVM;
  program code which responds to a first timer to periodically force a context switch from a JVM which is operating to the master JVM whereupon the master JVM services system interrupts and performs housekeeping duties; and
  program code which responds to a second timer to determine when a predetermined interval of time has elapsed and, at the expiration of the predetermined time period to cause the master JVM to perform a context switch to the next JVM to become operational.

22. The computer program product according to claim 21 wherein the program code which responds to the second timer comprises program code which activates a proxy thread after the predetermined interval of time has elapsed; and program code in the proxy thread which handles JVM-specific interrupts, checks the status of the next JVM and starts the next JVM.

23. The computer program product according to claim 21 wherein the data and control structures for each of the plurality of JVMs are referenced by a single table and wherein the program code which responds to the first timer causes a context switch by changing references from a first table associated with one JVM to a second table associated with a second JVM.

24. The computer program product according to claim 21 further comprising program code which limits access to data and control structures for each JVM to the data and control structures created for the each JVM by responding to a comparison of an address used to access the data and control structure to predetermined limits.

25. The computer program product according to claim 24 wherein the program code which limits access to data and control structures allows the master JVM to access all data and control structures.

* * * * *